United States Patent
Mauritzson

(10) Patent No.: US 7,755,121 B2
(45) Date of Patent: Jul. 13, 2010

(54) IMAGERS, APPARATUSES AND SYSTEMS UTILIZING PIXELS WITH IMPROVED OPTICAL RESOLUTION AND METHODS OF OPERATING THE SAME

(75) Inventor: Richard A. Mauritzson, Meridian, ID (US)

(73) Assignee: Aptina Imaging Corp., Grand Cayman (KY)

( * ) Notice: Subject to any disclaimer, the term of this patent is extended or adjusted under 35 U.S.C. 154(b) by 230 days.

(21) Appl. No.: 11/844,099

(22) Filed: Aug. 23, 2007

(65) Prior Publication Data

US 2009/0050943 A1 Feb. 26, 2009

(51) Int. Cl.
*H01L 27/146* (2006.01)

(52) U.S. Cl. ..................................................... 257/292

(58) Field of Classification Search ................ 257/184, 257/187, 257, 258, 290–294, 371, E27.133; 348/308, E3.016
See application file for complete search history.

(56) References Cited

U.S. PATENT DOCUMENTS

| | | | |
|---|---|---|---|
| 5,537,256 A | 7/1996 | Fergason | |
| 5,548,392 A | 8/1996 | Ogawa | |
| 6,243,055 B1 | 6/2001 | Fergason | |
| 6,300,977 B1 | 10/2001 | Waechter et al. | |
| 6,373,619 B1 | 4/2002 | Sandstrom | |
| 6,483,952 B2 | 11/2002 | Gregory et al. | |
| 6,747,783 B1 | 6/2004 | Sandstrom | |
| 7,039,795 B2 | 5/2006 | Balmer et al. | |
| 7,408,539 B2 * | 8/2008 | Yonemoto | 345/204 |
| 7,642,497 B2 * | 1/2010 | Rhodes | 250/208.1 |
| 2002/0075202 A1 | 6/2002 | Fergason | |
| 2005/0012836 A1 * | 1/2005 | Guidash | 348/302 |
| 2006/0132633 A1 * | 6/2006 | Nam et al. | 348/308 |
| 2007/0064129 A1 | 3/2007 | Suzuki | |
| 2008/0136933 A1 | 6/2008 | Dosluoglu et al. | |

FOREIGN PATENT DOCUMENTS

| | | |
|---|---|---|
| EP | 1 376 168 A1 | 1/2004 |
| WO | WO 2006/130518 A1 | 12/2006 |
| WO | WO 2007/142171 A1 | 12/2007 |

OTHER PUBLICATIONS

Yiyao, Li et al., "Multisensor Image Fusion Using Influence Factor Modification and the ANOVA Methods", IEEE Transactions on Geoscience and Remote Sensing, vol. 38, No. 4, pp. 1976-1988, Jul. 2000.
Kawashima, H. et al., "A ¼ Inch Format 250K Pixel Amplified MOS Image Sensor Using CMOS Process", International Electron Devices Meeting, Washington, DC, USA, Dec. 5-8, 1993, pp. 575-578.

* cited by examiner

*Primary Examiner*—Wai-Sing Louie
*Assistant Examiner*—Sue Tang
(74) *Attorney, Agent, or Firm*—Dickstein Shapiro LLP

(57) ABSTRACT

A pixel array resolution is doubled by adding a plurality of second photodiodes, but only a single, common transfer control line. By controlling a combination of the single, common transfer control line and a transfer control line unique to controlling first transfer transistors in pixels in a row, first and second photodiodes in a pixel can be separately readout.

21 Claims, 21 Drawing Sheets

IMAGERS, APPARATUSES AND SYSTEMS UTILIZING PIXELS WITH IMPROVED OPTICAL RESOLUTION AND METHODS OF OPERATING THE SAME

FIELD OF THE INVENTION

Embodiments described herein relate generally to improved semiconductor imaging devices and in particular to imaging devices having an array of pixels and to methods of operating the pixels.

BACKGROUND OF THE INVENTION

A conventional four transistor (4T) circuit for a pixel 150 of a CMOS imager is illustrated in FIG. 1. The 4T pixel 150 has a photosensor such as a photodiode 162, a reset transistor 184, a transfer transistor 190, a source follower transistor 186, and a row select transistor 188. It should be understood that FIG. 1 shows the circuitry for operation of a single pixel 150, and that in practical use, there will be an M×N array of pixels arranged in rows and columns with the pixels of the array being accessed using row and column select circuitry, as described in more detail below.

The photodiode 162 converts incident photons to electrons, which are selectively passed to a floating diffusion node A through transfer transistor 190 when the transistor 190 is activated by the TX1 control signal. The source follower transistor 186 has its gate connected to node A and thus amplifies the signal appearing at the floating diffusion node A. When a particular row containing pixel 150 is selected by an activated row select transistor 188, the signal amplified by the source follower transistor 186 is passed on a column line 170 to column readout circuitry (not shown). The photodiode 162 accumulates a photo-generated charge in a doped region of its substrate during a charge integration period. It should be understood that the pixel 150 may include a photogate or other photon to charge converting device, in lieu of a photodiode, as the initial accumulator for photo-generated charge.

The gate of transfer transistor 190 is coupled to a transfer control signal line 191 for receiving the TX1 control signal, thereby serving to control the coupling of the photodiode 162 to node A. A voltage source Vpix is selectively coupled through reset transistor 184 and conductive line 163 to node A. The gate of reset transistor 184 is coupled to a reset control line 183 for receiving the RST control signal to control the reset operation in which the voltage source Vpix is connected to node A.

A row select signal (Row Sel) on a row select control line 160 is used to activate the row select transistor 188. Although not shown, the row select control line 160, reset control line 183, and transfer signal control line 191 are coupled to all of the pixels of the same row of the array. Voltage source Vpix is coupled to transistors 184 and 186 by conductive line 195. The column line 170 is coupled to all of the pixels of the same column of the array and typically has a current sink 176 at its lower end. Maintaining a positive voltage on the column line 170 during an image acquisition phase keeps the potential in a known state on the column line 170. Signals from the pixel 150 are therefore selectively coupled to a column readout circuit (FIGS. 2-4) through the column line 170 and through a pixel output ("Pix_out") line coupled between the column line 170 and the column readout circuit.

As known in the art, a value can be read from pixel 150 in a two step correlated double sampling process. First, node A is reset by activating the reset transistor 184. The reset signal (e.g., Vpix) found at node A is readout to column line 170 via the source follower transistor 186 and the activated row select transistor 188. During a charge integration period, photodiode 162 produces charge from incident light. This is also known as the image acquisition period. After the integration period, transfer transistor 190 is activated and the charge from the photodiode 162 is passed through the transfer transistor to node A, where the charge is amplified by source follower transistor 186 and passed to column line 170 through the row select transistor 188 as an integrated charge signal Vsig. As a result, two different voltage signals—the reset signal Vrst and the integrated charge signal Vsig—are readout from the pixel 150 and sent on the column line 170 to column readout circuitry, where each signal is sampled and held for further processing as known in the art. Typically, all pixels in a row are readout simultaneously onto respective column lines 170 and the column lines may be activated in sequence or in parallel for pixel reset and signal voltage readout.

FIG. 2 shows an example CMOS imager integrated circuit chip 201 that includes an array 230 of pixels and a controller 232, which provides timing and control signals to enable reading out of signals stored in the pixels in a manner commonly known to those skilled in the art. Exemplary arrays have dimensions of M×N pixels, with the size of the array 230 depending on a particular application. The pixel signals from the array 230 are readout a row at a time using a column parallel readout architecture. The controller 232 selects a particular row of pixels in the array 230 by controlling the operation of row addressing circuit 234 and row drivers 240. Signals corresponding to charges stored in the selected row of pixels and reset signals are provided on the column lines 170 to a column readout circuit 242 in the manner described above. The pixel signal read from each of the columns can be readout sequentially using a column addressing circuit 244. Pixel signals (Vrst, Vsig) corresponding to the readout reset signal and integrated charge signal are provided as respective outputs Vout1, Vout2 of the column readout circuit 242 where they are subtracted in differential amplifier 246, digitized by analog to digital converter 248, and sent to an image processor circuit 250 for image processing.

FIG. 3 shows more details of the rows and columns 249 of active pixels 150 in an array 230. Each column 249 includes multiple rows of pixels 150. Signals from the pixels 150 in a particular column 249 can be readout to sample and hold circuitry 261 associated with the column 249 (part of circuit 242) for acquiring the pixel reset and integrated charge signals. Signals stored in the sample and hold circuits 261 can be read sequentially column-by-column to the differential amplifier 246 (FIG. 2), which subtracts the reset and integrated charge signals and sends them to the analog-to-digital converter (ADC) 248 (FIG. 2). A plurality of ADC's 248 may also be provided, each digitizing sampled and held signals from one or more columns 249.

FIG. 4 illustrates a portion of the sample and hold circuit 261 of FIG. 3 in greater detail. The sample and hold circuit 261 holds a set of signals, e.g., a reset signal Vrst and an integrated charge signal Vsig from a desired pixel. For example, a reset signal Vrst of a desired pixel on column line 170 is stored on capacitor 228 and the integrated charge signal Vsig is stored on capacitor 226.

The operation of the circuits illustrated in FIGS. 1-4 is now described with reference to the simplified signal timing diagram of FIG. 5. During an image integration/acquisition period 290 the Row Sel signal on the row select line 160 is set to a logic low level to disable the row select transistor 188 and isolate the pixel 150 from the column line 170.

A readout period 298 for pixel 150 is separated into a readout period 292 for the readout of the reset signal, and a readout period 294 for the readout of the integrated charge signal. To begin the overall readout period 298, the row select signal on the row select line 160 is set to a logic high level to enable the row select transistor 188 and couple the pixel 150 to the column line 170. Just prior to readout, the reset control signal Reset is pulsed onto line 183, whereby the reset transistor 184 is activated and node A of the pixel 150 is reset by the reset voltage Vpix. To begin the reset signal readout period 292, the reset voltage Vpix on node A is transferred to the column line 170 via source follower transistor 186 and row select transistor 188 and stored in capacitor 228 when the SHR pulse is applied to switch 220 (FIG. 4) of the sample and hold circuit 261. Thus, the reset signal (Vrst) of the desired pixel 150 is sampled and stored on capacitor 228. After the reset signal Vrst is stored, the reset readout period 292 ends.

After the reset readout period 292 ends, an integrated charge signal readout period 294 begins. Transfer transistor 190 is enabled by a transfer control signal TX1 being pulsed on line 191. The integrated charge which has been integrating at photodiode 162 is transferred onto node A. Subsequently, the integrated charge signal on node A is transferred onto the column line 170 via source follower transistor 186 and row select transistor 188 and stored in capacitor 226 when an SHS signal is applied to switch 222 (FIG. 4) of the sample and hold circuit 261. That is, capacitor 226 stores the integrated charge signal Vsig. The integrated charge signal readout period 294 and the readout period 298 are completed. Just prior to the next integration/acquisition period 290, the row select signal on the row select line 160 is set to a logic low level to disable the row select transistor 188 and isolate the pixel 150 from the column line 170. Node A of pixel 150 is reset by reset voltage Vpix during the reset period 296. The transfer control signal TX1 can also be optionally pulsed during the reset period 296 to clear out any residual charge in the photodiode 162.

FIG. 6 depicts a portion of a shared floating diffusion pixel array 230'. The pixel array 230' would typically have M×N shared pixels circuits 150', where each shared pixel circuit 150' has a shared floating diffusion node A, reset transistor 184, source follower transistor 186, and row select transistor 188. In addition, each shared pixel 150' has transfer transistors 190, 190a, and photodiodes 162, 162a respectively coupled to the transfer transistors 190, 190a. Each photodiode, e.g., 162, and associated transfer transistor, e.g. 190, make up an imager pixel, which shares a pixel readout circuit with one or more other pixels. FIG. 6 illustrates a two way shared pixel circuit 150', but other shared arrangements, e.g., 4-way shared and others, could also be used.

Pixel circuit 150' is similar in architecture to pixel 150 of FIGS. 1 and 2, with a difference in that circuit 150' has several photodiodes 162, 162a switchably coupled through respective transfer transistors 190, 190a to a common floating diffusion node A. Although FIG. 6 is shown with two rows of pixels, e.g., the pixel including photodiode 162 and the pixel including photodiode 162a, implementation of the array 230' is, as noted, not limited to a two-way shared arrangement. Array 230' includes the TX1a transfer control line, 191a to control the transfer transistor 190a. A readout operation of circuit 150' is similar to the readout operation described above in FIGS. 1-5 with reference to circuit 150 except that node A is reset in between the readout from the photodiode 162 and the photodiode 162a.

There exists an ever present need to reduce the size of imagers, yet, it is also desirable to more effectively use the die area within pixels without significantly increasing pixel circuitry. It is also desirable to improve pixel fill factor by using a larger area of the pixel for the photodiode.

DETAILED DESCRIPTION OF THE INVENTION

In the following detailed description, reference is made to the accompanying drawings, which form a part hereof, and in which is shown by way of illustration specific embodiments. These embodiments are described in sufficient detail to enable those of ordinary skill in the art to make and use them, and it is to be understood that structural, logical, or procedural changes may be made.

The embodiments described herein provide an improved imager and method of operation which reduces the circuitry required to operate the pixels arrays of the imager and increases fill factor. By adding an additional signal line to a each row/readout trunk of a pixel, optical resolution can be increased for a given array dimension.

Figure 7:
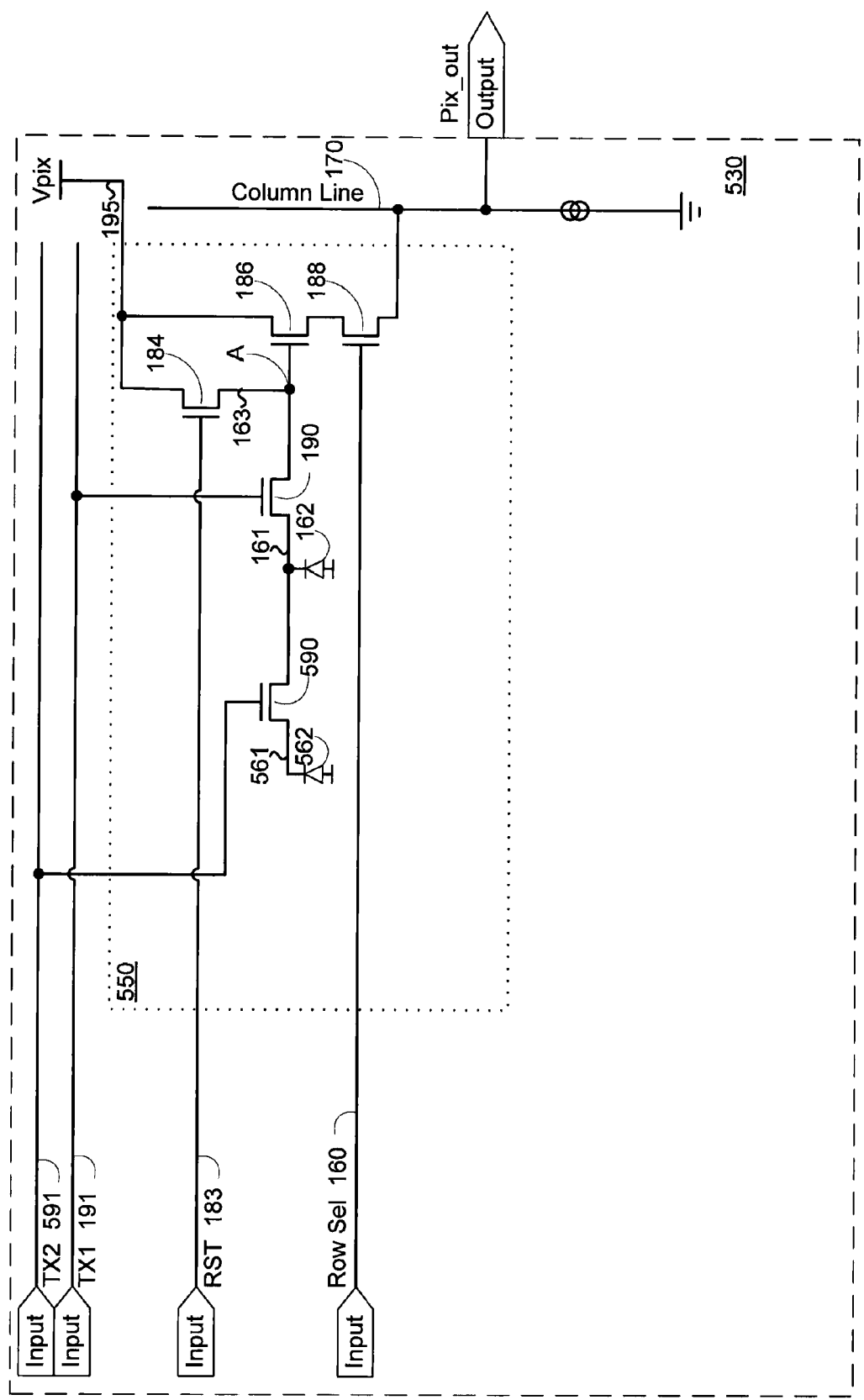
FIG. 7 is an electrical schematic diagram of a pixel in accordance with an embodiment of the invention.
Figure 10:
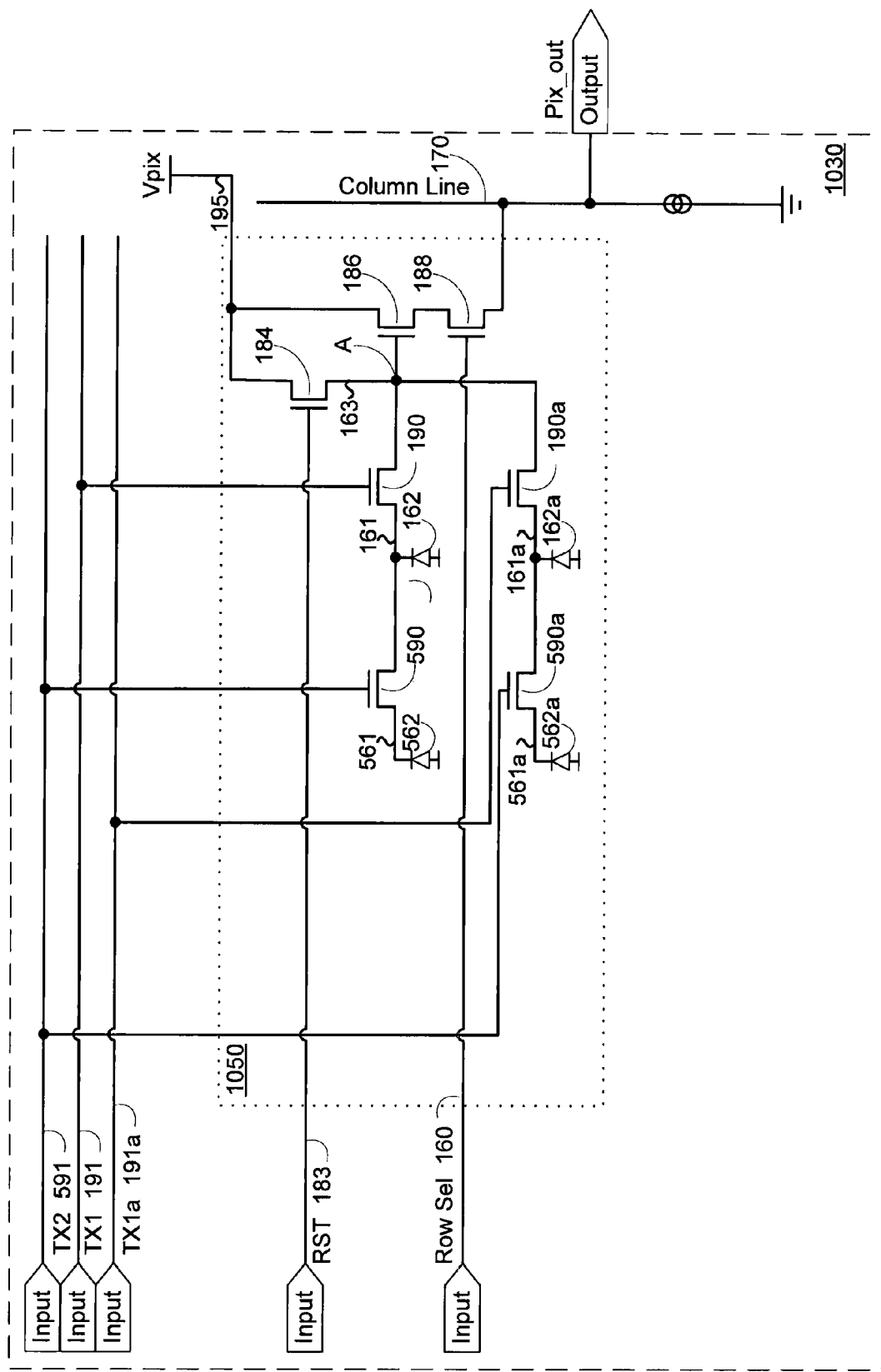
FIG. 10 is an electrical schematic diagram of a pixel in accordance with a second embodiment of the invention.
Figure 13:
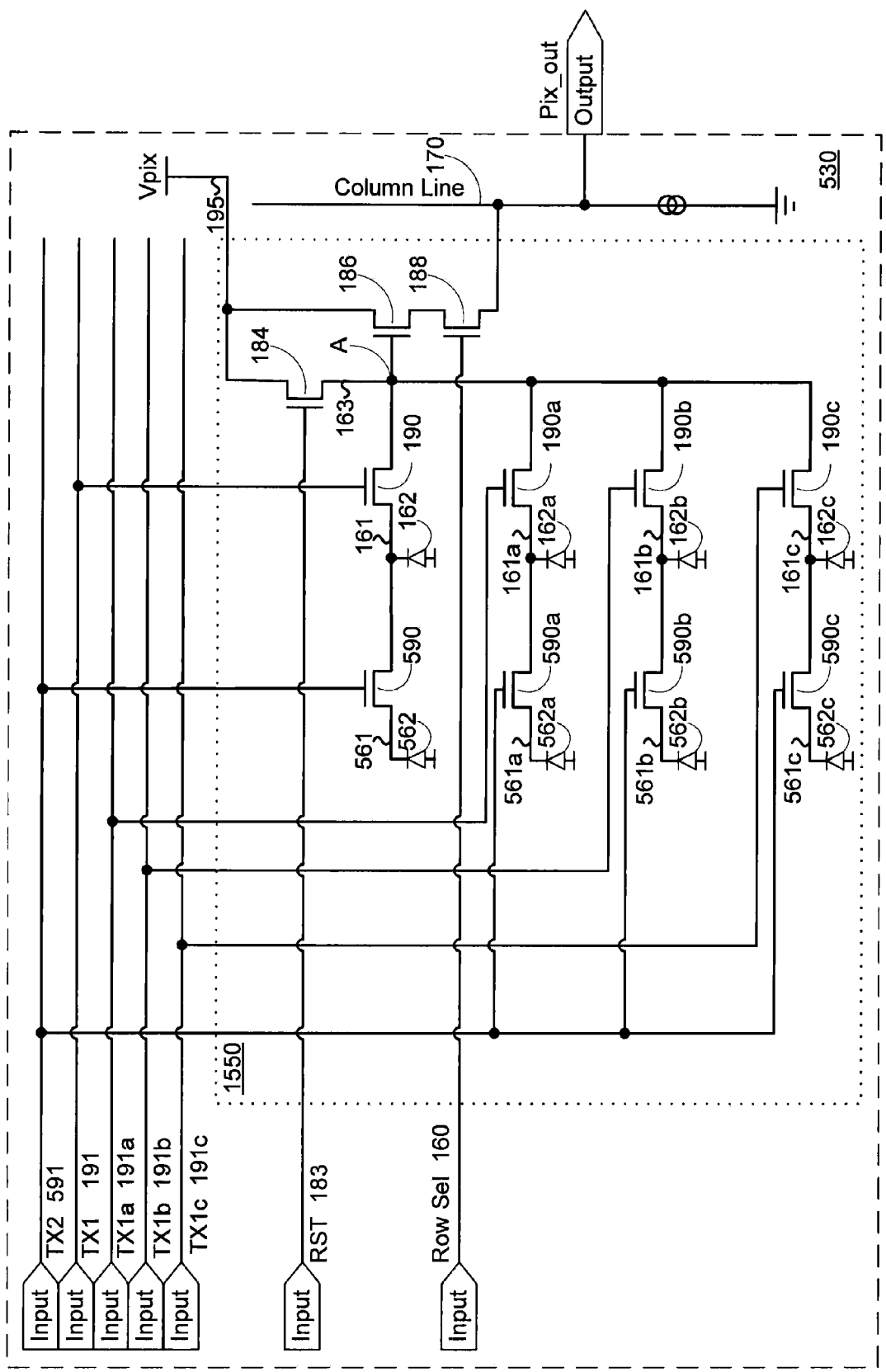
FIG. 13 is an electrical schematic diagram of a pixel in accordance with a third embodiment of the invention.

According to a first embodiment, shown in FIG. 7, a signal line is added to a 4T pixel along with an additional photodiode such that the optical resolution of the circuit is doubled (i.e., from one to two photodiodes). According to a second embodiment, a signal line is added to a two-way shared pixel along with additional photodiodes and the optical resolution is doubled, from two to four photodiodes (FIG. 10). According to a third embodiment, a signal line is added to a four-way shared pixel along with additional photodiodes and the optical resolution is doubled, from four to eight photodiodes (FIG. 13).

Figure 1:
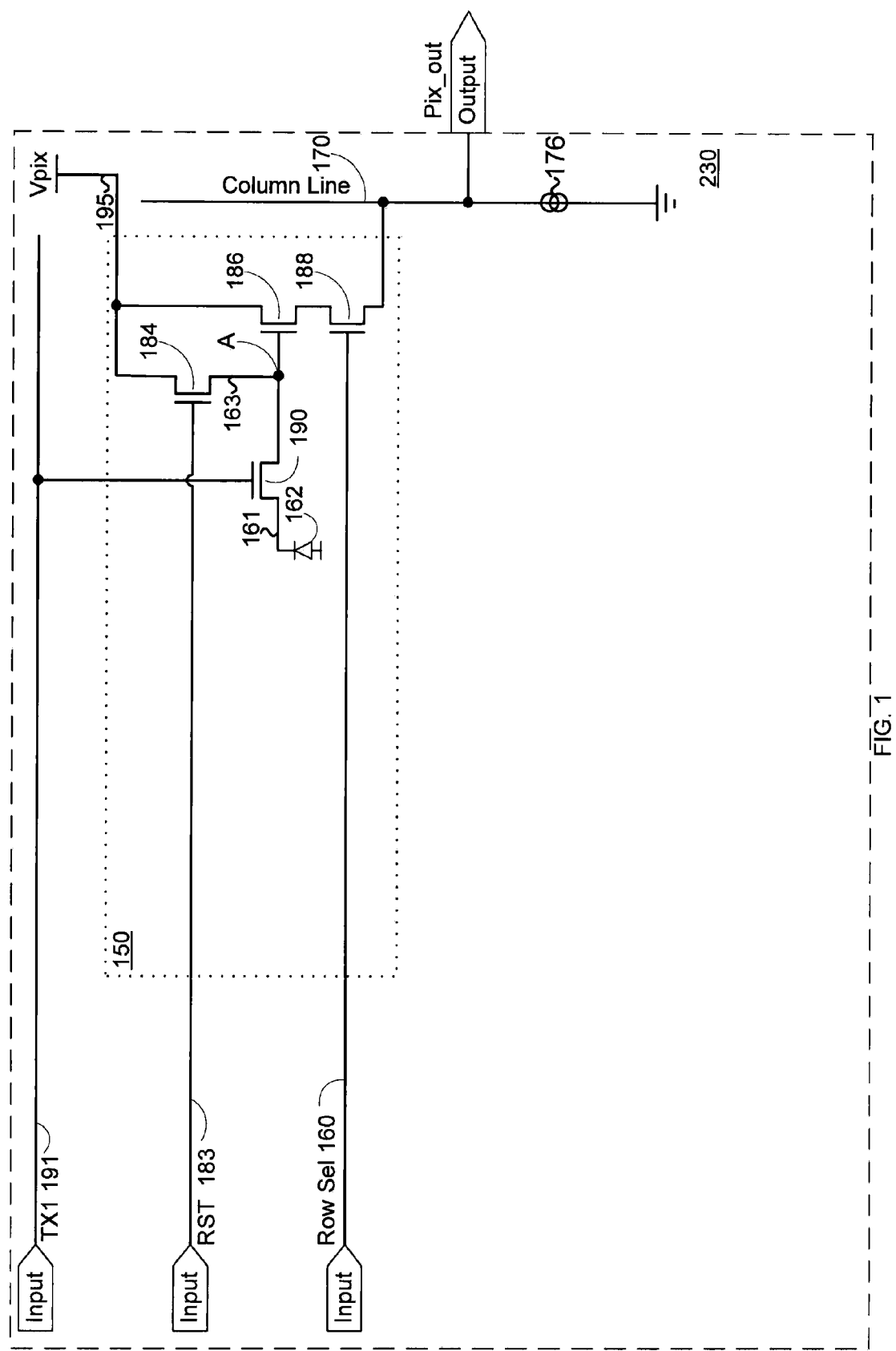
FIG. 1 is an electrical schematic diagram of a conventional imager pixel.

FIG. 7 depicts an electrical schematic of a portion of a pixel array 530 having a pixel circuit 550 according to a first embodiment. The pixel circuit 550 is similar to pixel 150 of FIG. 1, but includes an additional photodiode 562 and associated transfer transistor 590. In this embodiment, the additional photodiode 562 is selectively coupled through the photodiode 162 and transfer transistor 190 to floating diffusion node A when transfer transistor 590 is activated by a TX2 control signal. An additional signal line, i.e., line 591, is also included to pass the TX2 control signal and to control the transfer transistor 590.

As depicted in FIG. 7, photodiode 562, similar to photodiode 162, converts incident photons to electrons. The electrons from photodiode 562 are passed to the floating diffusion node A through transfer transistor 590 when activated by the TX2 control signal, through photodiode 162, and through transfer transistor 190 when activated by the TX1 control signal. The gate of transfer transistor 590 is coupled to the transfer control signal line 591 for receiving the TX2 control signal, thereby serving to control the coupling of the photodiode 562 to node A.

Figure 8A:
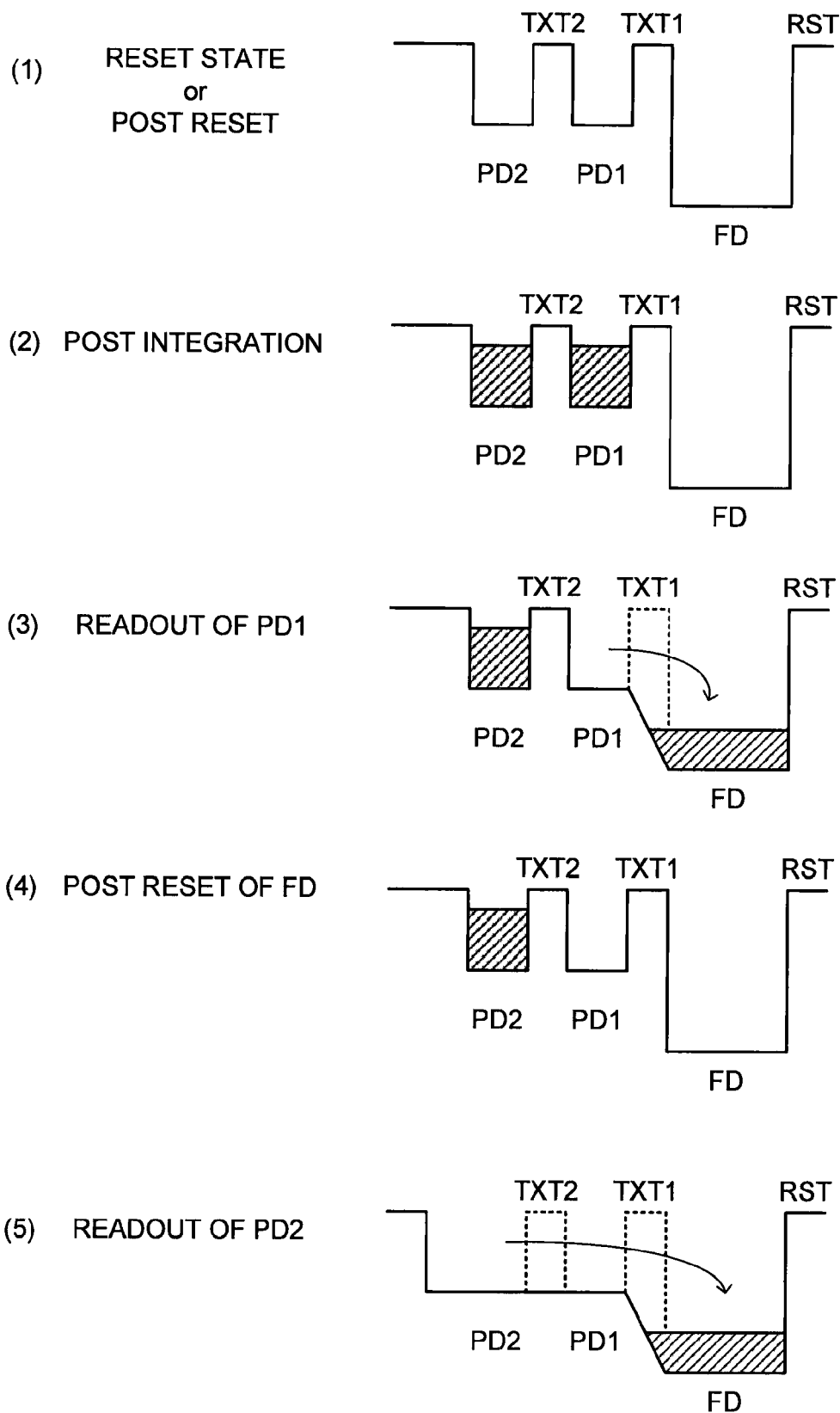
FIGS. 8a, 8b, and 8c are potential diagrams depicting the voltage potential at different times during a readout from a pixel of FIG. 7.
Figure 8B:
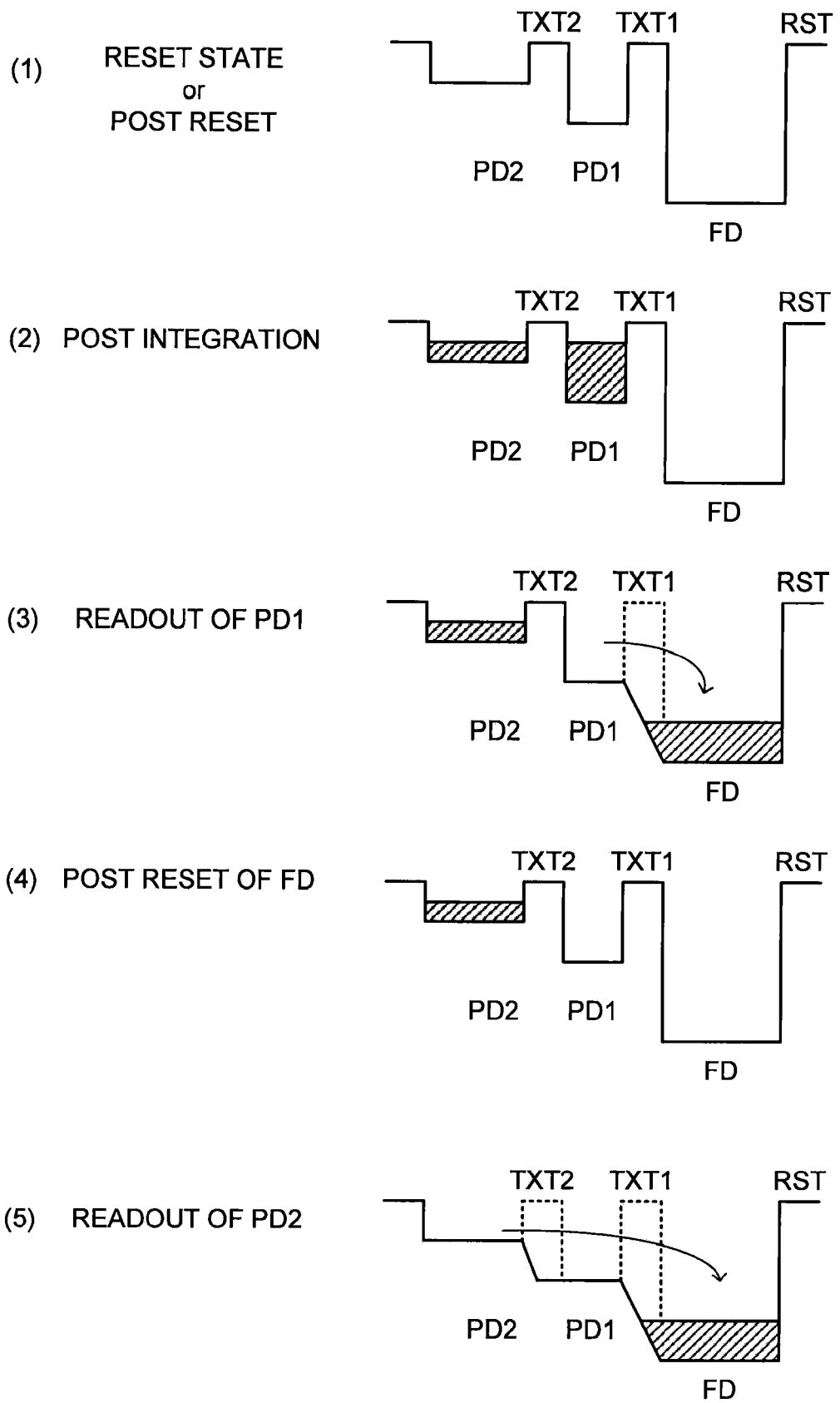
Figure 8C:
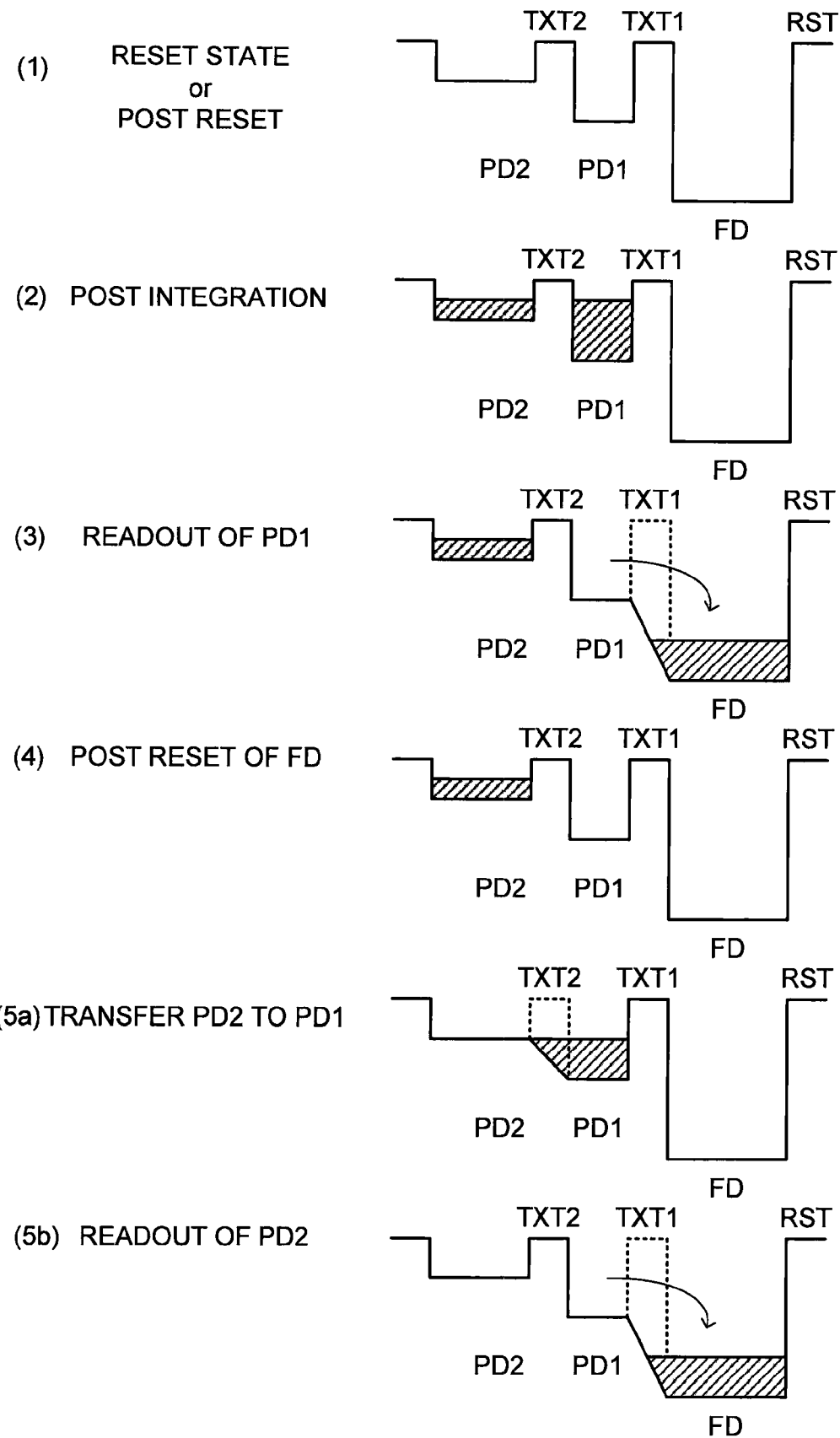

Referring now to FIGS. 7, 8a, 8b, and 8c, FIGS. 8a, 8b, and 8c depict potential diagrams for pixel circuit 550 and are representative of the potential of photodiode 162 ("PD1"), the transfer transistor 190 ("TXT1"), photodiode 562 ("PD2"), the transfer transistor 590 ("TXT2"), and the floating diffusion node A ("FD"). FIGS. 8a, 8b, and 8c depict potential diagrams (1) after a reset period; (2) after an integration period; (3) after a readout of PD1; (4) after the reset of the floating diffusion node FD; and (5) after a readout of PD2. For effective charge transfer, the maximum voltage that can be held by PD2 should be equivalent to (as shown in FIG. 8a) or less than (as shown in FIGS. 8b and 8c) the maximum voltage that can be held by PD1. Referring to FIG. 8a, to transfer an integrated charge signal from PD2 to FD, both TXT1 and TXT2 are activated (by the TX1 and TX2 control signals) so that they are open concurrently, thereby coupling PD2, PD1, and FD. Thus, the integrated charge signal is transferred from PD2 to PD1 to FD.

It should be noted that when operating TXT1 and TXT2 concurrently, the voltage signal applied to TXT2, would need to be optimized to prevent creating a potential 'pocket' underneath TXT2 that would trap charge, and hinder full transfer of charge to the FD region. The potential diagrams depicted in FIGS. 8b and 8c allows more flexibility. To transfer an integrated charge signal from PD2 to the floating diffusion node FD, both TXT1 and TXT2 can be activated concurrently or sequentially. In all three cases (FIGS. 8a, 8b, and 8c), the capacitance of PD1 and PD2 should be optimized depending on the application and for effective transfer of charge from PD1 or PD2 to the floating diffusion node FD.

Figure 3:
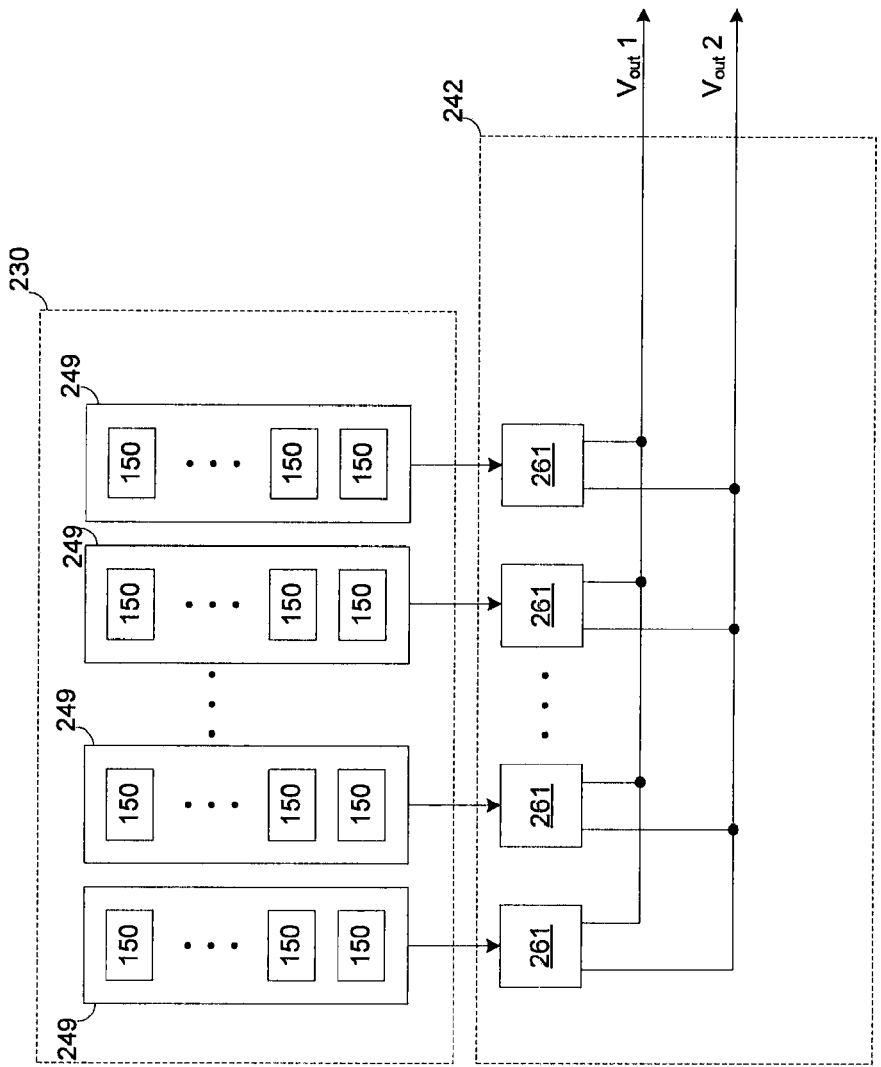
FIG. 3 is a block diagram of a portion of an array of pixels illustrated in FIG. 2 and an associated column readout circuit.
Figure 4:
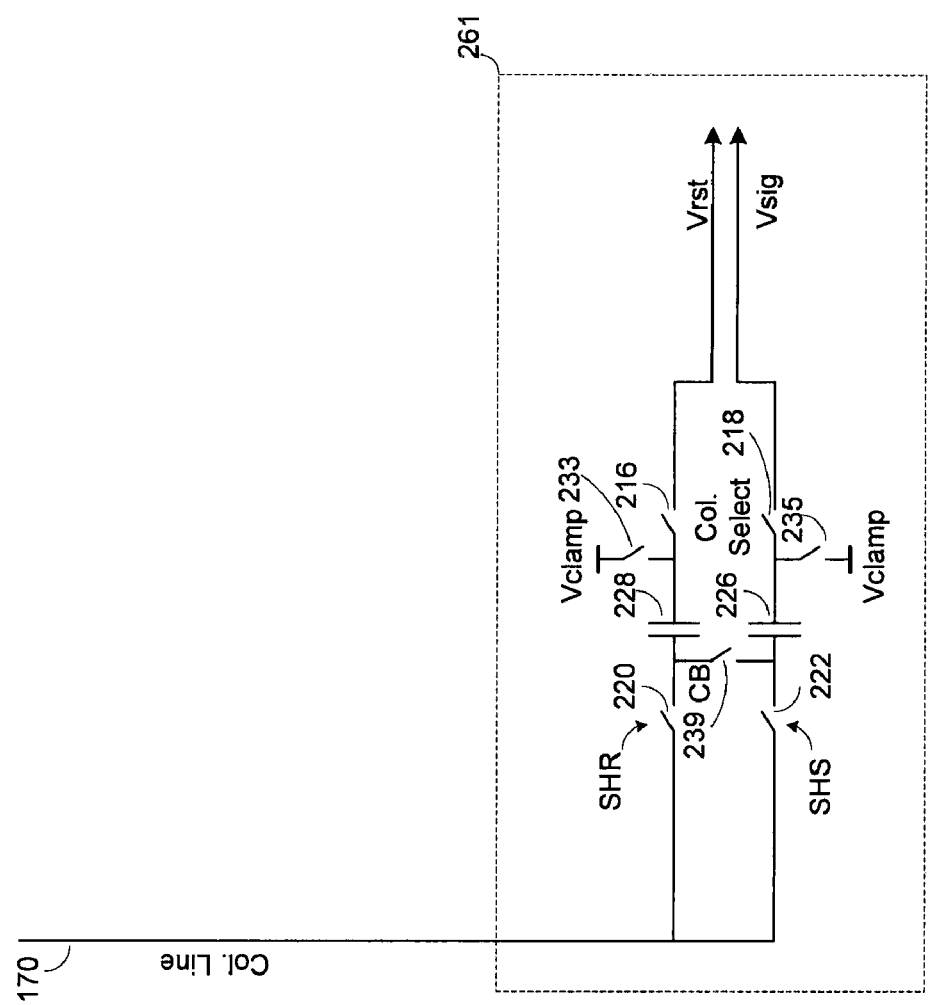
FIG. 4 is a conventional sample and hold circuit.
Figure 5:
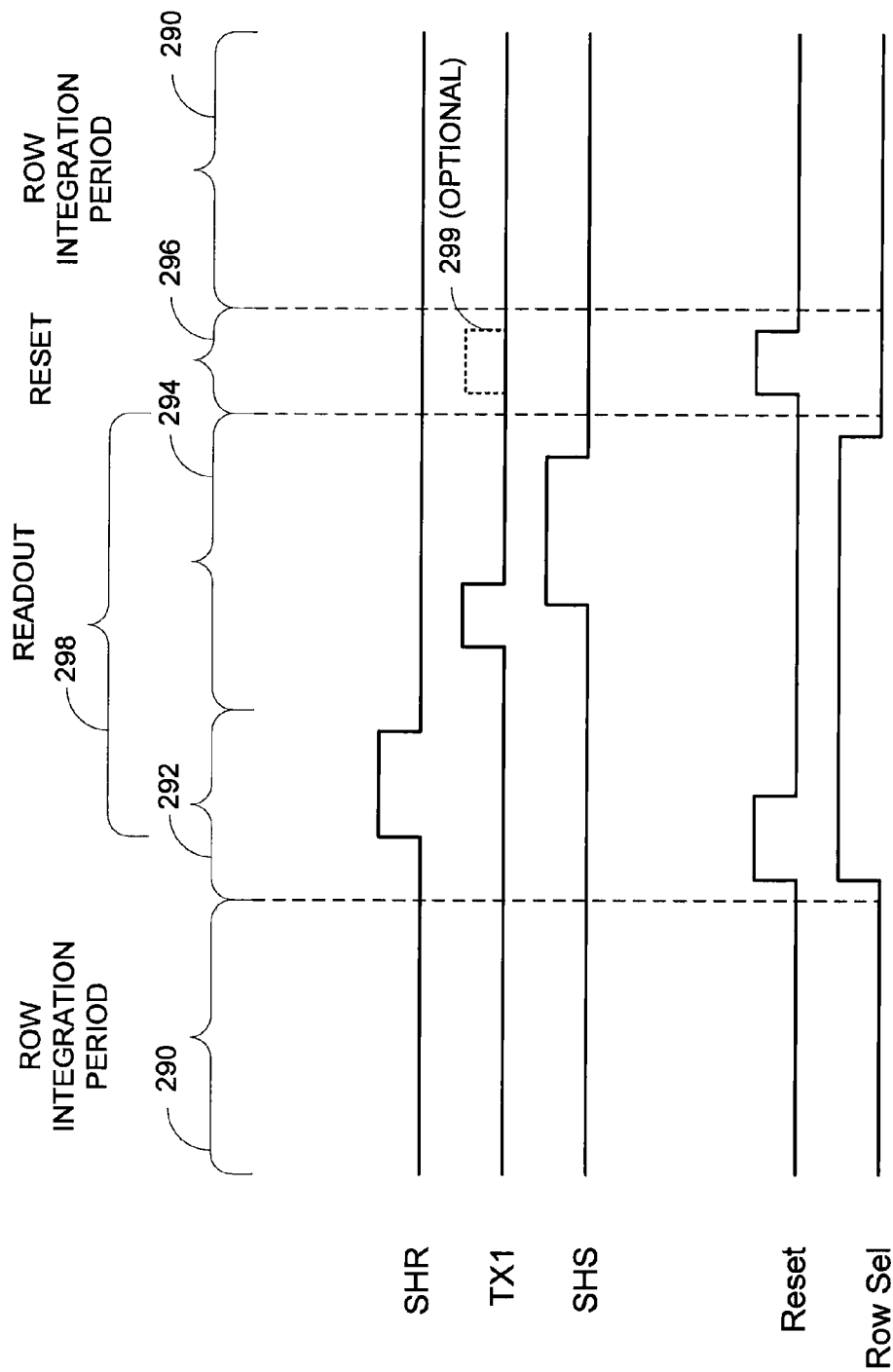
FIG. 5 is a simplified timing diagram associated with operation of the circuitry of FIGS. 1-4.
Figure 9:
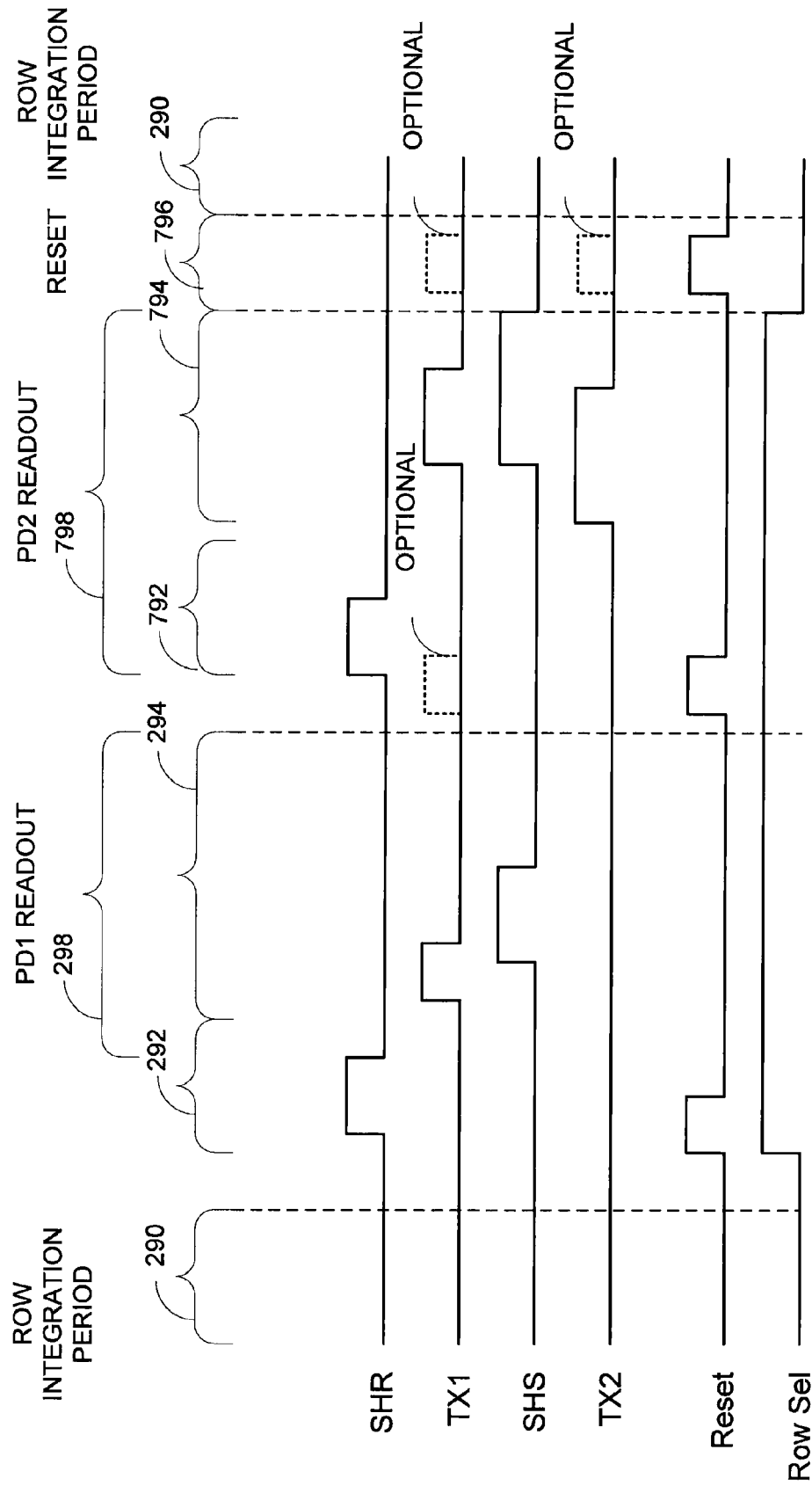
FIG. 9 is a timing diagram associated with the circuitry of FIG. 7.

The operation of the circuit of FIGS. 3, 4, and 7 is now described with reference to the simplified signal timing diagram of FIG. 9. The timing diagram is illustrative of the timing of a readout of two pixels, e.g., the pixel including photodiode 162 and the pixel including photodiode 562, of a pixel circuit 550 from a pixel array 530, as well as a portion of an integration/acquisition period that precedes the readout period. During an image integration/acquisition period 290 the row select signal on the row select line 160 is set to a logic low level to disable the row select transistor 188 and to isolate the pixel circuit 550 from the column line 170.

A readout period for pixel circuit 550 is separated into a readout period 292 for the readout of a first reset signal, a readout period 294 for the readout of the integrated charge signal from photodiode 162, a readout period 792 for the readout of a second reset signal, and a readout period 794 for the readout of the integrated charge signal from photodiode 562.

To begin the overall readout period 298 for the first photodiode 162 (PD1), the row select signal on the row select line 160 is set to a logic high level to enable the row select transistor 188 and couple the pixel circuit 550 to the column line 170. Just prior to readout, the reset control signal Reset is pulsed onto line 183, whereby the reset transistor 184 is activated and node A of the pixel 550 is reset by the reset voltage Vpix. To begin the first reset signal readout period 292, the reset voltage Vpix on node A is transferred to the column line 170 via source follower transistor 186 and row select transistor 188 and stored in capacitor 228 when the SHR pulse is applied to switch 220 (FIG. 4) of the sample and hold circuit 261. Thus, reset signal (Vrst) of the first pixel of the desired pixel circuit 550 is sampled and stored on capacitor 228. After this reset signal is stored, the first reset readout period 292 ends.

After the first reset readout period 292 ends, an integrated charge signal readout period 294 begins. Transfer transistor 190 is enabled by a transfer control signal TX1 being pulsed on line 191. The integrated charge which has been integrating at photodiode 162 is transferred onto node A. Subsequently, the integrated charge signal on node A is transferred onto the column line 170 via source follower transistor 186 and row select transistor 188 and stored in capacitor 226 when an SHS signal is applied to switch 222 (FIG. 4) of the sample and hold circuit 261. That is, capacitor 226 stores the integrated charge signal Vsig. The integrated charge signal readout period 294 and the PD1 readout period 298 are completed.

To begin the overall readout period 798 for the photodiode 562 (PD2), the Row Sel signal on the row select line 160 is maintained at, or set to, a logic high level to enable the row select transistor 188 and couple the pixel circuit 550 to the column line 170. Just prior to readout, the reset control signal Reset is pulsed onto line 183, whereby the reset transistor 184 is activated and node A of the pixel 550 is reset by the reset voltage Vpix. TX1 can also (optionally) be pulsed during this period to clear out any residual charge in PD1. To begin the second reset signal readout period 792, the reset voltage Vpix on node A is transferred to the column line 170 via source follower transistor 186 and row select transistor 188 and stored in capacitor 228 when the SHR pulse is applied to switch 220 (FIG. 4) of the sample and hold circuit 261. Thus, reset signal (Vrst) of the second pixel of the pixel circuit 550 is sampled and stored on capacitor 228. After this reset signal is stored, the second reset readout period 792 ends.

After the second reset readout period 792 ends, an integrated charge signal readout period 794 begins. Transfer transistor 590 is enabled by a transfer control signal TX2 being pulsed on line 591. The integrated charge, which has been integrating at photodiode 562, is transferred onto photodiode 162. Transfer transistor 190 is enabled by a transfer control signal TX1 being pulsed on line 191. The integrated charge at photodiode 162, which has been received from photodiode 562, is transferred onto node A. During this time/transfer, both TX2 and TX1 signals are being pulsed concurrently. Subsequently, the integrated charge signal on node A is transferred onto the column line 170 via source follower transistor 186 and row select transistor 188 and stored in capacitor 226 when an SHS signal is applied to switch 222 (FIG. 4) of the sample and hold circuit 261. That is, capacitor 226 stores the integrated charge signal Vsig. The integrated charge signal readout period 794 and the PD2 readout period 798 are completed. Just prior to the next acquisition/integration period 290, the Row Sel signal on the row select line 160 is set to a logic low level to disable the row select transistor 188 and isolate the pixel circuit 550 from the column line 170. Node A of pixel circuit 550 is reset by reset voltage Vpix during the next acquisition/reset period 796. TX1 and TX2 can also (optionally) be pulsed during this period (796) to clear out any residual charge in PD1 or PD2 prior to the next integration period. Thus, two pairs of signals (Vrst, Vsig) have been readout from pixel circuit 550—one pair of signals from the pixel that includes photodiode 162 and one pair of signals from the pixel that includes photodiode 562.

The pixel array 530 that includes pixels 550 provides several advantages: a first advantage is the doubling of photodiodes which ensures spatial resolution by the simple addition of a single control line, i.e., transfer control line 591 for the TX2 signal, a photodiode 562, and transfer transistor 590. Another advantage is that sharing density can be doubled without needing to increase the capacity of floating diffusion node A. Thus, conversion gain remains high. Furthermore, the addition of photodiodes PD2 can allow for variations in the design and layout of a pixel array. For example, the additional photodiodes PD2 can be a different color than the photodiodes PD1 connected to the transfer transistor 190 (TXT1), or they can be the same color to provide greater spatial resolution within the same color.

Figure 6:
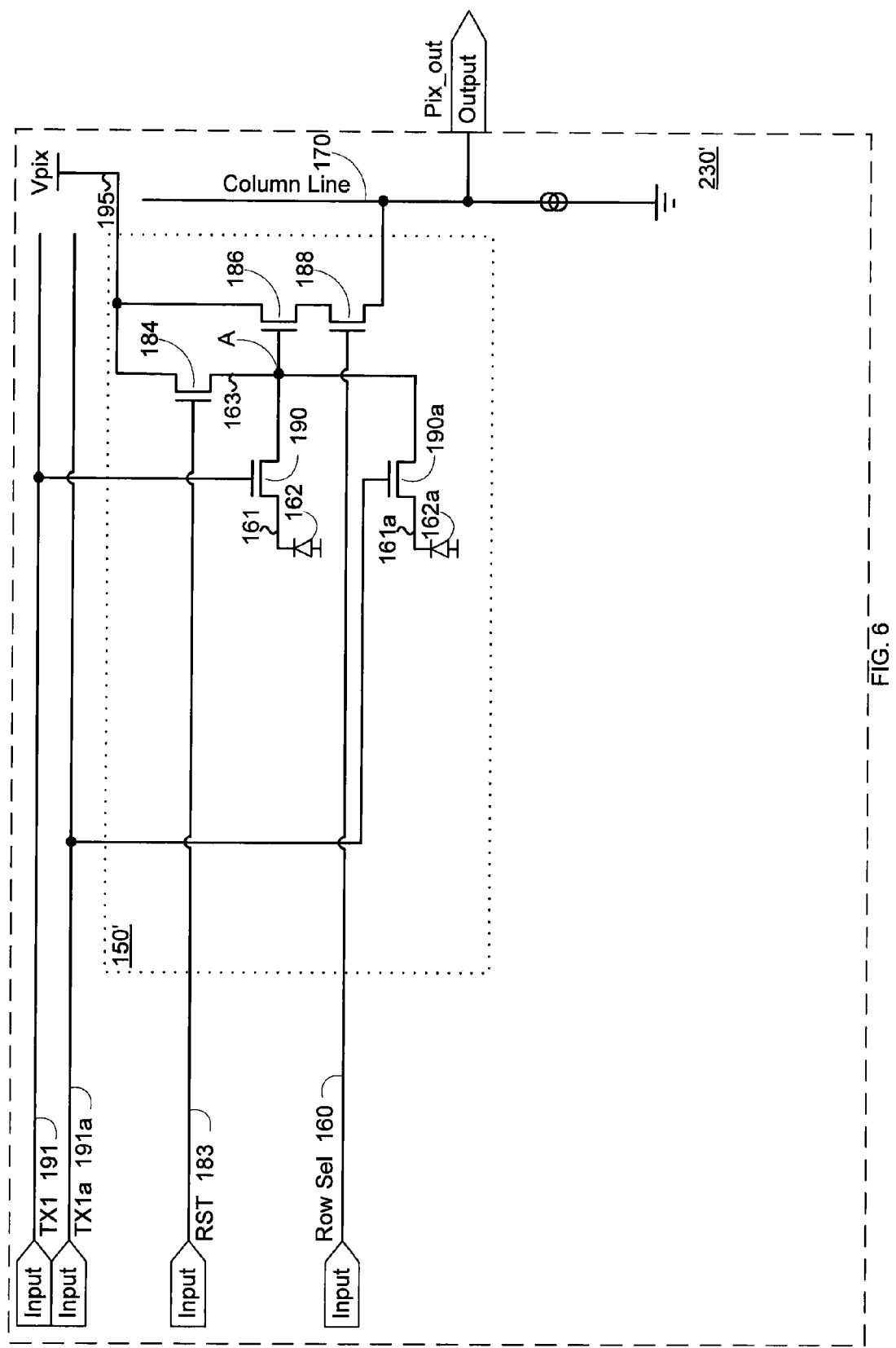
FIG. 6 is an electrical schematic diagram of a portion of a pixel array showing a floating diffusion node shared by two pixels.

FIG. 10 depicts an electrical schematic of a portion of an array 1030 having a two-way shared pixel circuit 1050 according to a second embodiment. The pixel circuit 1050 is similar to pixel 150' of FIG. 6, but includes additional photodiodes 562, 562a and associated transistors 590, 590a. In this embodiment, the photodiode 562 is selectively coupled through photodiode 162 and transfer transistor 190 to floating diffusion node A when transfer transistor 590 is activated by a TX2 control signal and transfer transistor 190 is activated by a TX1 control signal. The photodiode 562a is selectively coupled through photodiode 162a and transfer transistor 190a to floating diffusion node A when transfer transistor 590a is activated by a TX2 control signal and transfer transistor 190a is activated by a TX1a control signal. Compared to FIG. 7, FIG. 10 has an additional signal line 191a to control transistor 190a.

The operation of the circuit of FIGS. 3, 4, and 10 is now described with reference to the simplified signal timing diagram of FIGS. 1a and 11b. The timing diagram is illustrative of the timing of a readout of four pixels, e.g., the pixel including photodiodes 162, the pixel including photodiode 562, the pixel including photodiodes 162a, and the pixel including photodiode 562a, of a pixel circuit 1050 from a pixel array 1030, as well as a portion of an integration/acquisition period that precedes the readout period. During an image integration/acquisition period 290 the row select signal on the row select line 160 is set to a logic low level to disable the row select transistor 188 and to isolate the pixel circuit 1050 from the column line 170. Just prior to readout, the reset control signal Reset is pulsed onto line 183, whereby the reset transistor 184 is activated and node A of the pixel circuit 1050 is reset by the reset voltage Vpix.

A readout period for pixel circuit 1050 is separated into a readout period 292 for the readout of a first reset signal and a readout period 294 for the readout of the integrated charge signal from photodiode 162, a readout period 1292 for the readout of a second reset signal and a readout period 1294 for the readout of the integrated charge signal from photodiode 162a, a readout period 292_2 for the readout of a first reset signal and a readout period 294_2 for the readout of the integrated charge signal from photodiode 562, and a readout period 1292_2 for the readout of a second reset signal and a readout period 1294_2 for the readout of the integrated charge signal from photodiode 562a.

To begin the overall readout period 298 for the photodiode 162 (PD1), the row select signal on the row select line 160 is set to a logic high level to enable the row select transistor 188 and couple the pixel circuit 1050 to the column line 170. Just prior to readout, the reset control signal Reset is pulsed onto line 183, whereby the reset transistor 184 is activated and node A of the pixel circuit 1050 is reset by the reset voltage Vpix. To begin the first reset signal readout period 292, the reset voltage Vpix on node A is transferred to the column line 170 via source follower transistor 186 and row select transistor 188 and stored in capacitor 228 when the SHR pulse is applied to switch 220 (FIG. 4) of the sample and hold circuit 261. Thus, reset signal (Vrst) of the first pixel of the desired pixel circuit 1050 is sampled and stored on capacitor 228. After this reset signal is stored, the first reset readout period 292 ends.

After the first reset readout period 292 ends, an integrated charge signal readout period 294 begins. Transfer transistor 190 is enabled by a transfer control signal TX1 being pulsed on line 191. The integrated charge which has been integrating at photodiode 162 is transferred onto node A. Subsequently, the integrated charge signal on node A is transferred onto the column line 170 via source follower transistor 186 and row select transistor 188 and stored in capacitor 226 when an SHS signal is applied to switch 222 (FIG. 4) of the sample and hold circuit 261. That is, capacitor 226 stores the integrated charge signal Vsig. The integrated charge signal readout period 294 and the PD1 readout period 298 are completed. Prior to the next readout period 1298, the reset control signal Reset is pulsed onto line 183, whereby the reset transistor 184 is activated and node A of the pixel 1050 is reset by the reset voltage Vpix. TX1 can also (optionally) be pulsed during this period to clear out any residual charge in PD1.

To begin the overall readout period 1298 for the photodiode 162a (PD1a), the Row Sel signal on the row select line 160 is set to a logic high level to enable the row select transistor 188 and couple the pixel circuit 1050 to the column line 170. To begin the second reset signal readout period 1292, the reset voltage Vpix on node A is transferred to the column line 170 via source follower transistor 186 and row select transistor 188 and stored in capacitor 228 when the SHR pulse is applied to switch 220 (FIG. 4) of the sample and hold circuit 261. Thus, reset signal (Vrst) of the second pixel of the pixel circuit 1050 is sampled and stored on capacitor 228. After this reset signal is stored, the second reset readout period 1292 ends.

After the second reset readout period 1292 ends, an integrated charge signal readout period 1294 begins. Transfer transistor 190a is enabled by a transfer control signal TX1a being pulsed on line 191a. The integrated charge at photodiode 162a is transferred onto node A. Subsequently, the integrated charge signal on node A is transferred onto the column line 170 via source follower transistor 186 and row select transistor 188 and stored in capacitor 226 when an SHS signal is applied to switch 222 (FIG. 4) of the sample and hold circuit 261. That is, capacitor 226 stores the integrated charge signal Vsig. The integrated charge signal readout period 1294 and the PD1a readout period 1298 are completed. Thus, two pairs of signals (Vrst, Vsig) have been readout from pixel circuit 1050—one pair of signals from the pixel that includes photodiode 162 and one pair of signals from the pixel that includes photodiode 162a.

Figure 11A:
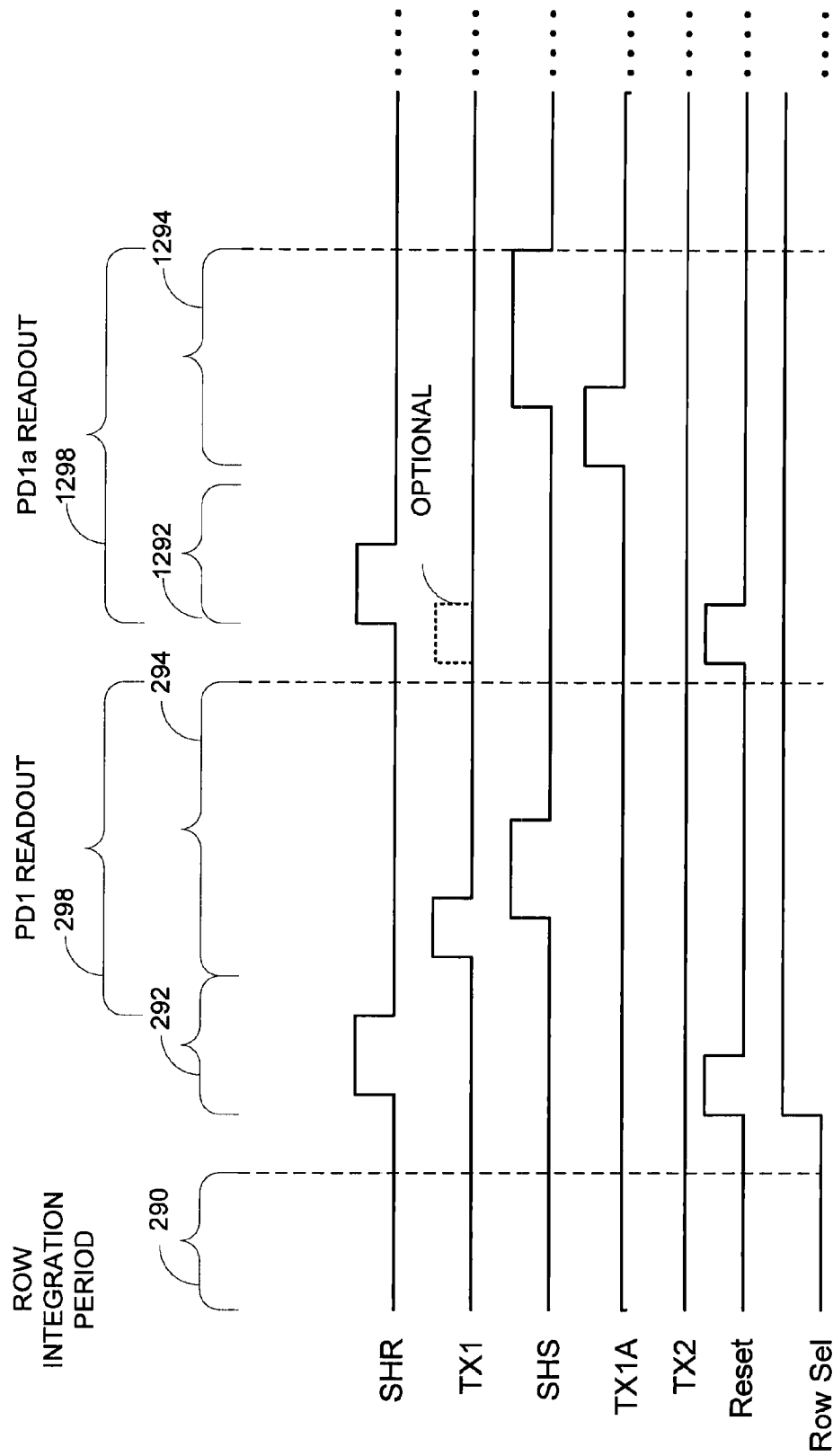
FIGS. 11a-11b are timing diagrams associated with the circuitry of FIG. 10.
Figure 11B:
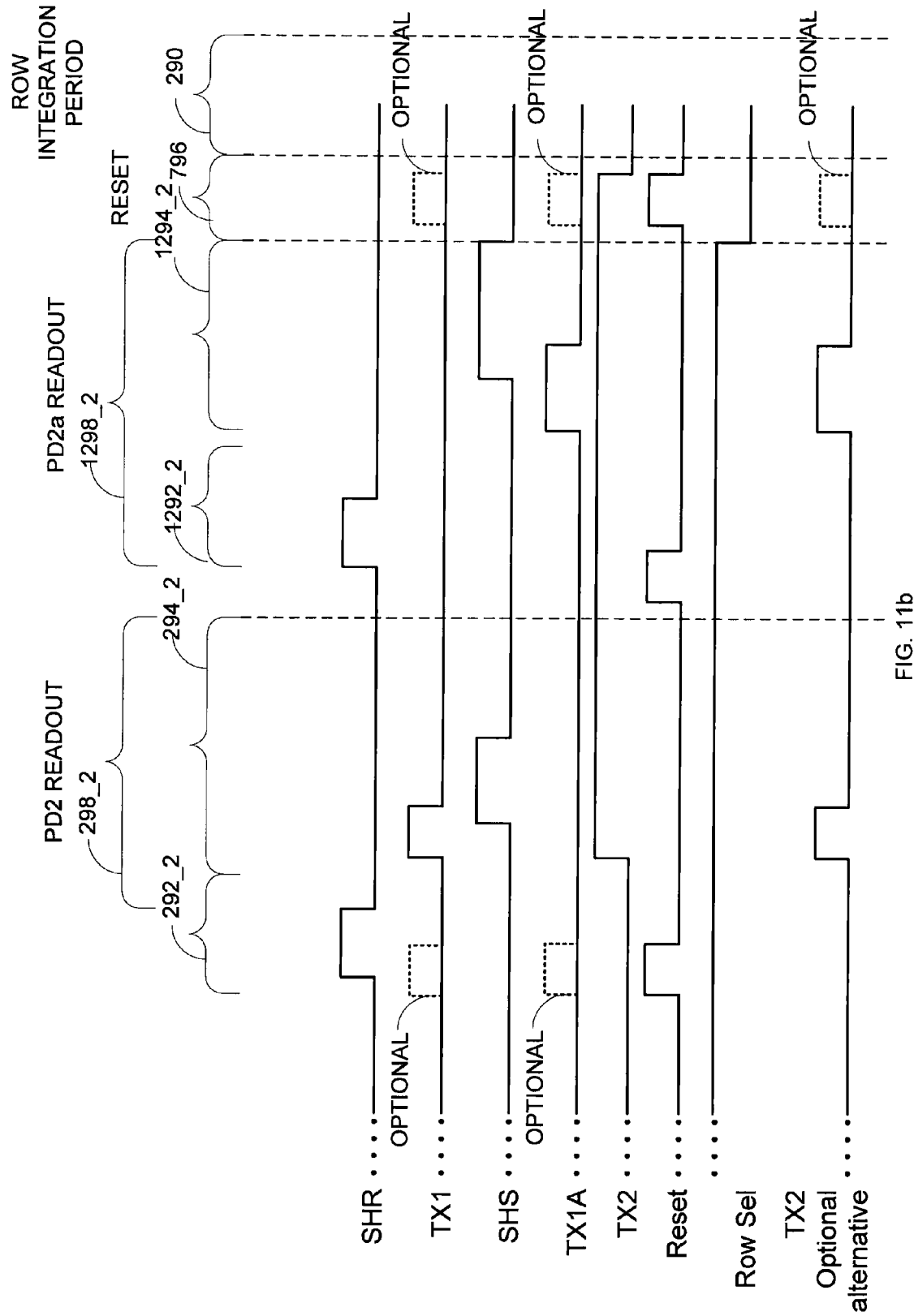

Referring to FIG. 11b, to begin the overall readout period 298_2 for photodiode 562 (PD2), the Row Sel signal on the row select line 160 is set to a logic high level to enable the row select transistor 188 and couple the pixel circuit 1050 to the column line 170. To begin the reset signal readout period 292_2, the reset control signal is pulsed onto line 183, whereby the reset transistor is activated and node A of pixel circuit 1050 is reset by reset voltage Vpix. TX1 and TX1a can also (optionally) be pulsed during this period (292_2) to clear out any residual charge in PD1 or PD1a prior to PD2 signal transfer (294_2). The reset voltage Vpix on node A is transferred to the column line 170 via source follower transistor 186 and row select transistor 188 and stored in capacitor 228 when the SHR pulse is applied to switch 220 (FIG. 4) of the sample and hold circuit 261. Thus, reset signal (Vrst) of another pixel of the pixel circuit 1050 is sampled and stored on capacitor 228. After this reset signal is stored, the reset readout period 292_2 ends.

After the reset readout period 292_2 ends, an integrated charge signal readout period 294_2 begins. Transfer transistor 590 is enabled by a transfer control signal TX2 being provided on line 591. The integrated charge, which has been integrating at photodiode 562, is transferred onto photodiode 162. Transfer transistor 190 is enabled by a transfer control signal TX1 being pulsed on line 191. The integrated charge at photodiode 162, which has been received from photodiode 562, is transferred onto node A. During this time/transfer, both TX2 and TX1 signals are being pulsed concurrently. Subsequently, the integrated charge signal on node A is transferred onto the column line 170 via source follower transistor 186 and row select transistor 188 and stored in capacitor 226 when an SHS signal is applied to switch 222 (FIG. 4) of the sample and hold circuit 261. That is, capacitor 226 stores the integrated charge signal Vsig. The integrated charge signal readout period 294_2 and the PD2 readout period 298_2 are completed.

To begin the overall readout period 1298_2 for photodiode 562a (PD2a), the Row Sel signal on the row select line 160 is maintained at, or set to, a logic high level to enable the row select transistor 188 and couple the pixel circuit 1050 to the column line 170. To begin the reset signal readout period 1292_2, the reset voltage Vpix on node A is transferred to the column line 170 via source follower transistor 186 and row select transistor 188 and stored in capacitor 228 when the SHR pulse is applied to switch 220 (FIG. 4) of the sample and hold circuit 261. Thus, reset signal (Vrst) of another pixel of the pixel circuit 1050 is sampled and stored on capacitor 228. After this reset signal is stored, the reset readout period 1292_2 ends.

After the reset readout period 1292_2 ends, an integrated charge signal readout period 1294_2 begins. Transfer transistor 590a is enabled by a transfer control signal TX2 being provided on line 591. The integrated charge, which has been integrating at photodiode 562a, is transferred onto photodiode 162a. Transfer transistor 190a is enabled by a transfer control signal TX1a being pulsed on line 191a. The integrated charge at photodiode 162a, which has been received from photodiode 562a, is transferred onto node A. During this time/transfer, both TX2 and TX1a signals are being pulsed concurrently. Subsequently, the integrated charge signal on node A is transferred onto the column line 170 via source follower transistor 186 and row select transistor 188 and stored in capacitor 226 when an SHS signal is applied to switch 222 (FIG. 4) of the sample and hold circuit 261. That is, capacitor 226 stores the integrated charge signal Vsig. The integrated charge signal readout period 1294_2 and the PD2a readout period 1298_2 are completed. Just prior to the next acquisition/integration period 290, the Row Sel signal on the row select line 160 is set to a logic low level to disable the row select transistor 188 and isolate the pixel circuit 1050 from the column line 170. Node A of pixel circuit 1050 is reset by reset voltage Vpix during the reset period 796. TX1, TX1a and TX2 can also (optionally) be pulsed during this period (796) to clear out any residual charge in PD1, PD1a, PD2, PD2a prior to the next integration period. Thus, an additional two pairs of signals (Vrst, Vsig) have been readout from pixel circuit 1050—one pair of signals from the pixel that includes photodiode 562 and one pair of signals from the pixel that includes photodiode 562a.

In another aspect, the TX2 is pulsed when the TX1 or TX1A transistors are pulsed. This is depicted in the TX2 optional alternative signal line, where this control signal would be used in place of TX2.

Figure 12A:
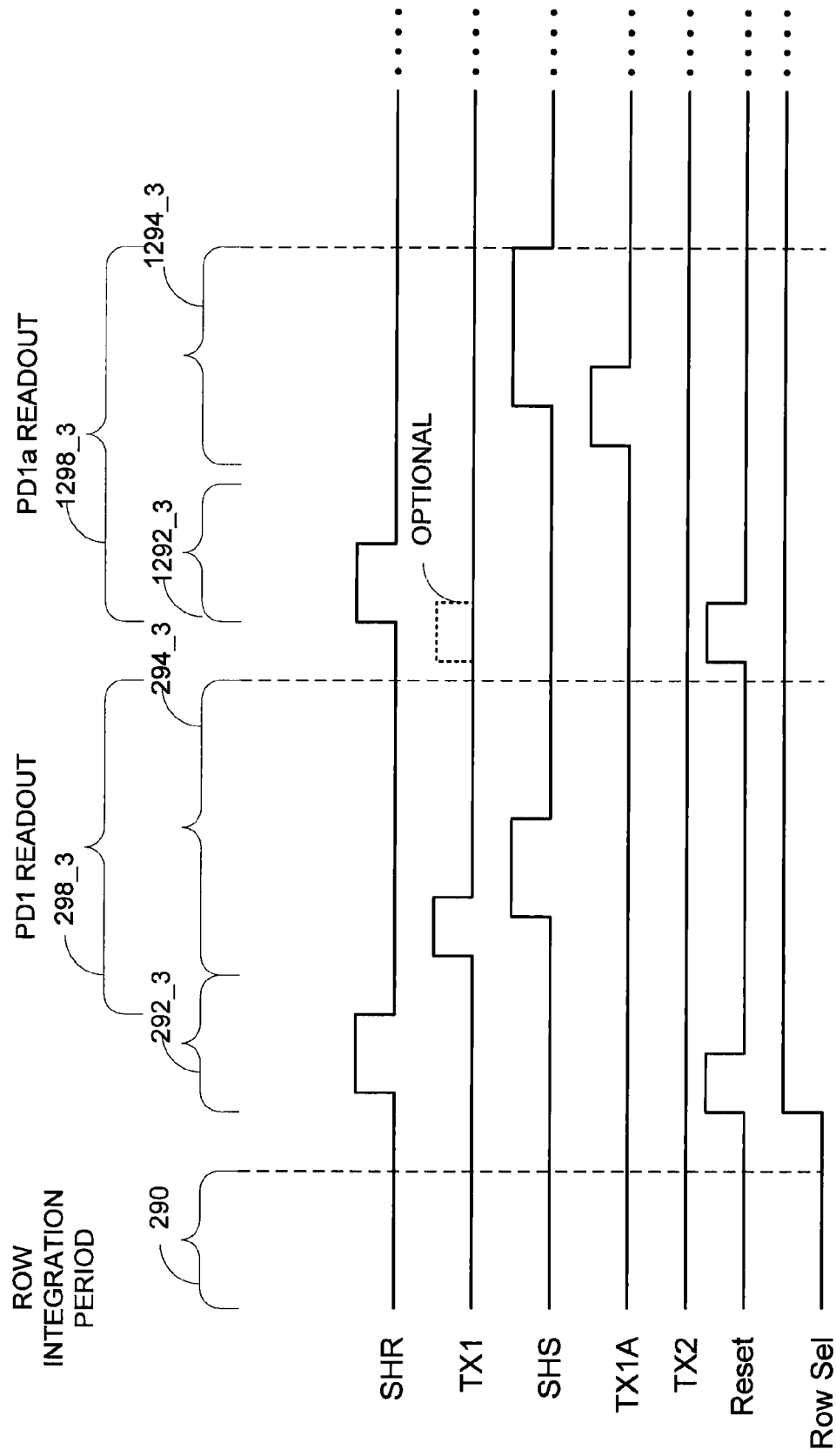
FIGS. 12a-12b are alternative timing diagrams associated with the circuitry of FIG. 10.
Figure 12B:
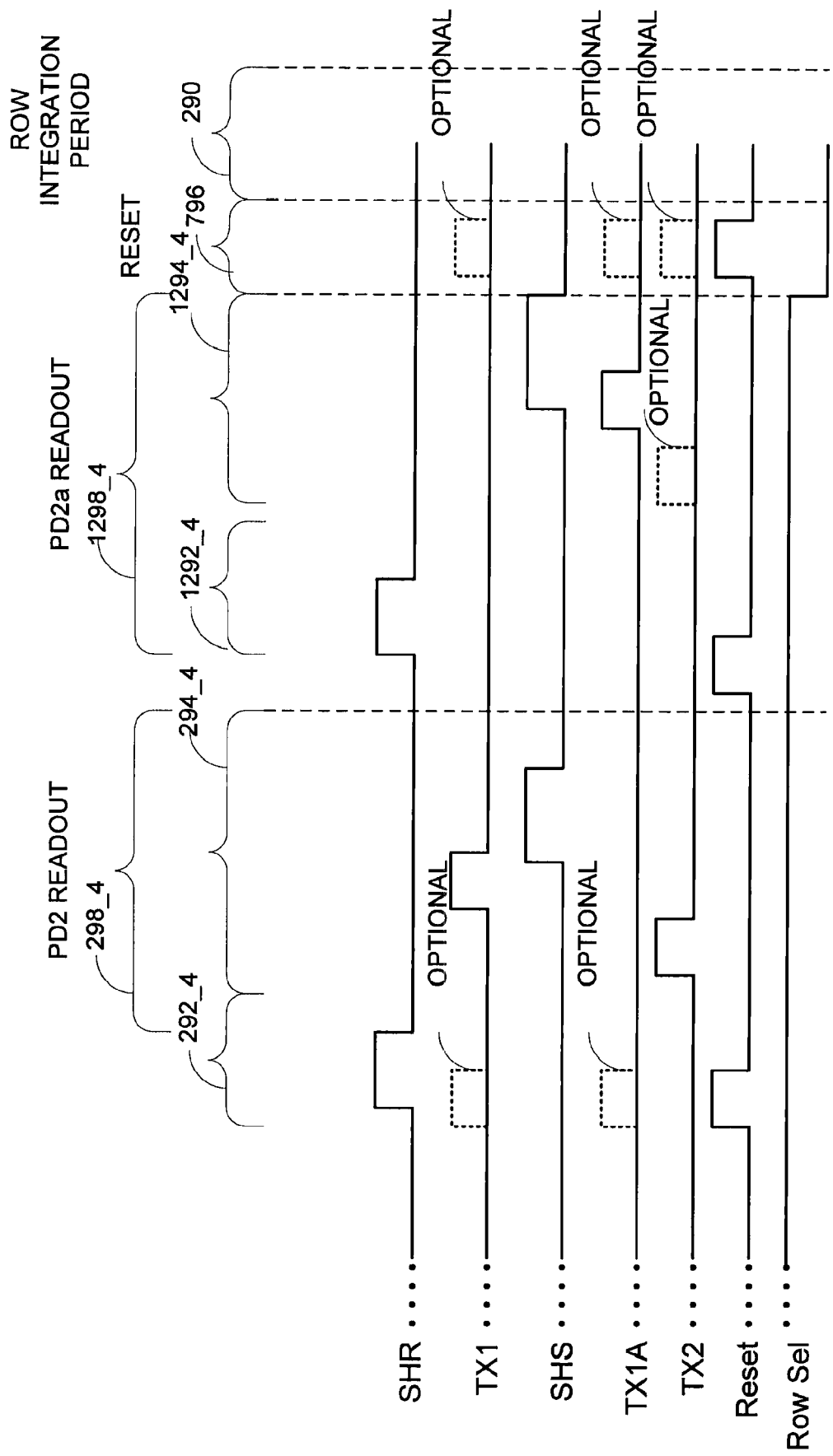

The operation of the circuit of FIGS. 3, 4, and 10 is described with reference to an alternative simplified signal timing diagram of FIGS. 12a and 12b. The timing diagram is illustrative of the timing of a readout of four pixels, e.g., the pixel including photodiodes 162, the pixel including photodiode 562, the pixel including photodiodes 162a, and the pixel including photodiode 562a, of a pixel circuit 1050 from a pixel array 1030, as well as a portion of an integration/acquisition period that precedes the readout period. Different from the readout as described above with reference to FIGS. 11a and 11b, transfer transistor 190 and transfer transistor 590 are activated sequentially, and are not activated at overlapping times. Additionally, transfer transistor 190a and transfer transistor 590a are activated sequentially, and are not activated at overlapping times.

FIG. 13 depicts an electrical schematic of a portion of an array 530 having a four-way shared pixel circuit 1550 according to a third embodiment. The pixel circuit 1550 is similar to pixel 1050 of FIG. 10, but includes additional photodiodes 162b, 162c, 562b, 562c, associated transistors 190b, 190c, 590b, 590c, and transfer control lines 191b, 191c.

In this embodiment, additional photodiode 562b is selectively coupled through photodiode 162b and transfer transistor 190b to floating diffusion node A when transfer transistor 590b is activated by a TX2 control signal and transfer transistor 190b is activated by a TX1b control signal. The photodiode 562c is selectively coupled through photodiode 162c and transfer transistor 190c to floating diffusion node A when transfer transistor 590c is activated by a TX2 control signal and transfer transistor 190c is activated by a TX1c control signal. Additional signal lines, i.e., TX1b line 191b and TX1c line 191c, are included to control the transfer transistors 190b, 190c. No additional signal lines are need to control transistors 590b, 590c as the existing signal line, i.e., TX2 line 591, which controls transistors 590a, 590b also controls transistors 590b, 590c.

Figure 14:
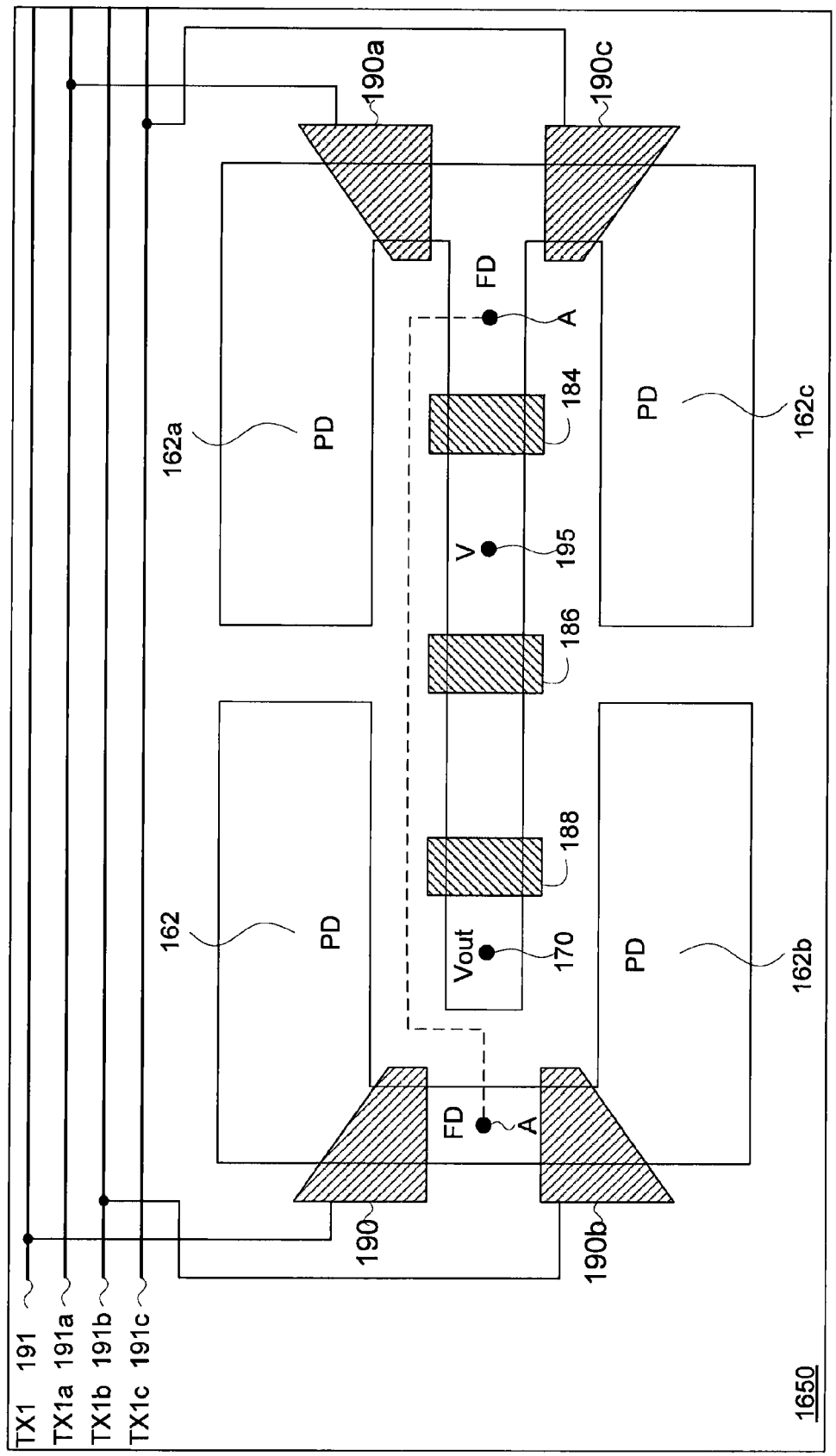
FIG. 14 is a top down view of a shared floating diffusion node readout pixel circuit.

FIG. 14 depicts top down view of a conventional four-way shared pixel circuit 1650. Pixel circuit 1650 includes four photodiodes 162, 162a, 162b, 162c and associated transfer gates 190, 190a, 190b, 190c coupled to transfer control lines 191, 191a, 191b, 191c, respectively. Pixel circuit 1650 also includes reset transistor gate 184, source follower transistor gate 186, row select transistor gate 188, voltage source V 195, column line output Vout 170, and floating diffusion node A.

Figure 15A:
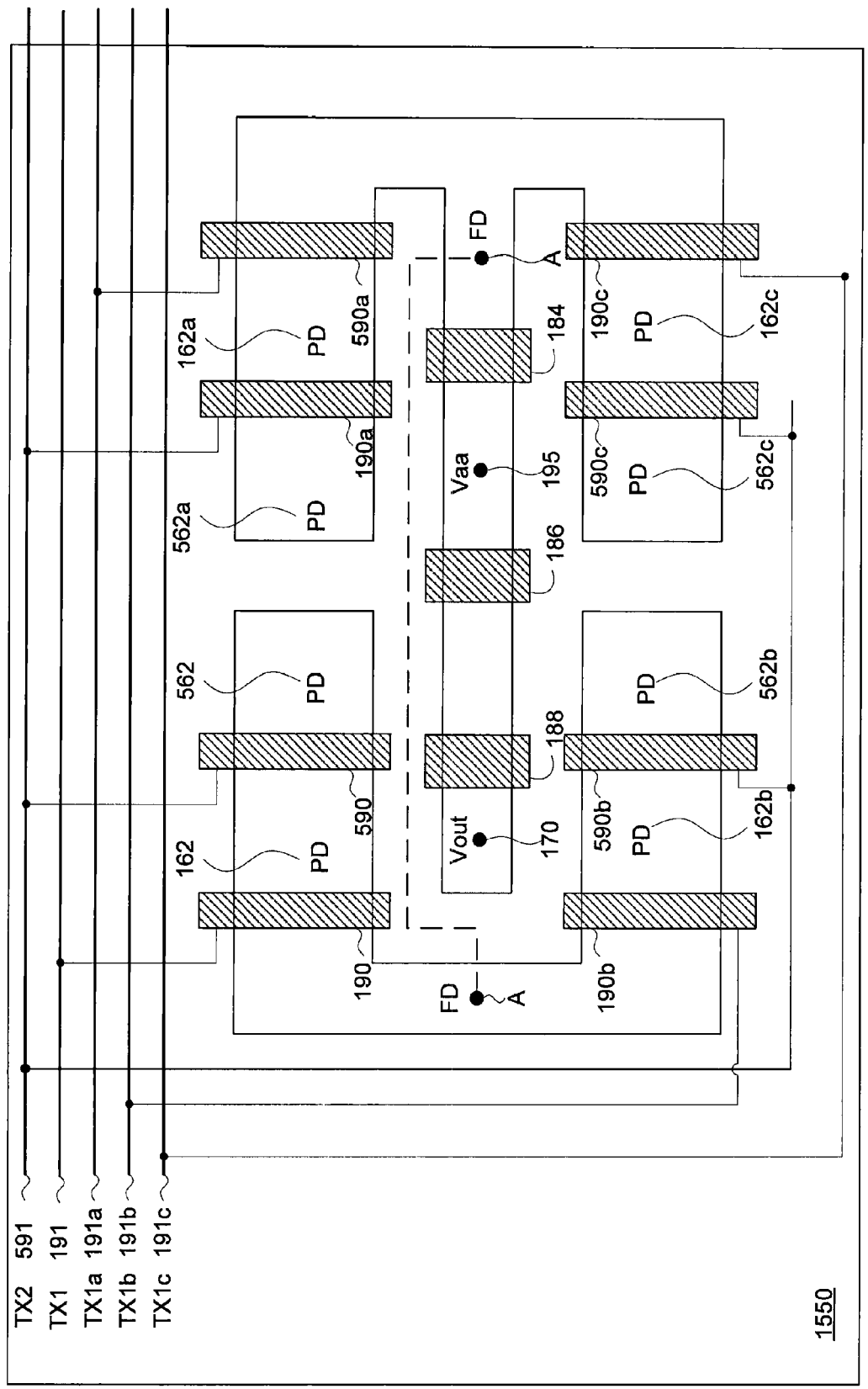
FIG. 15a is a top down view of the pixel of FIG. 13.
Figure 15B:
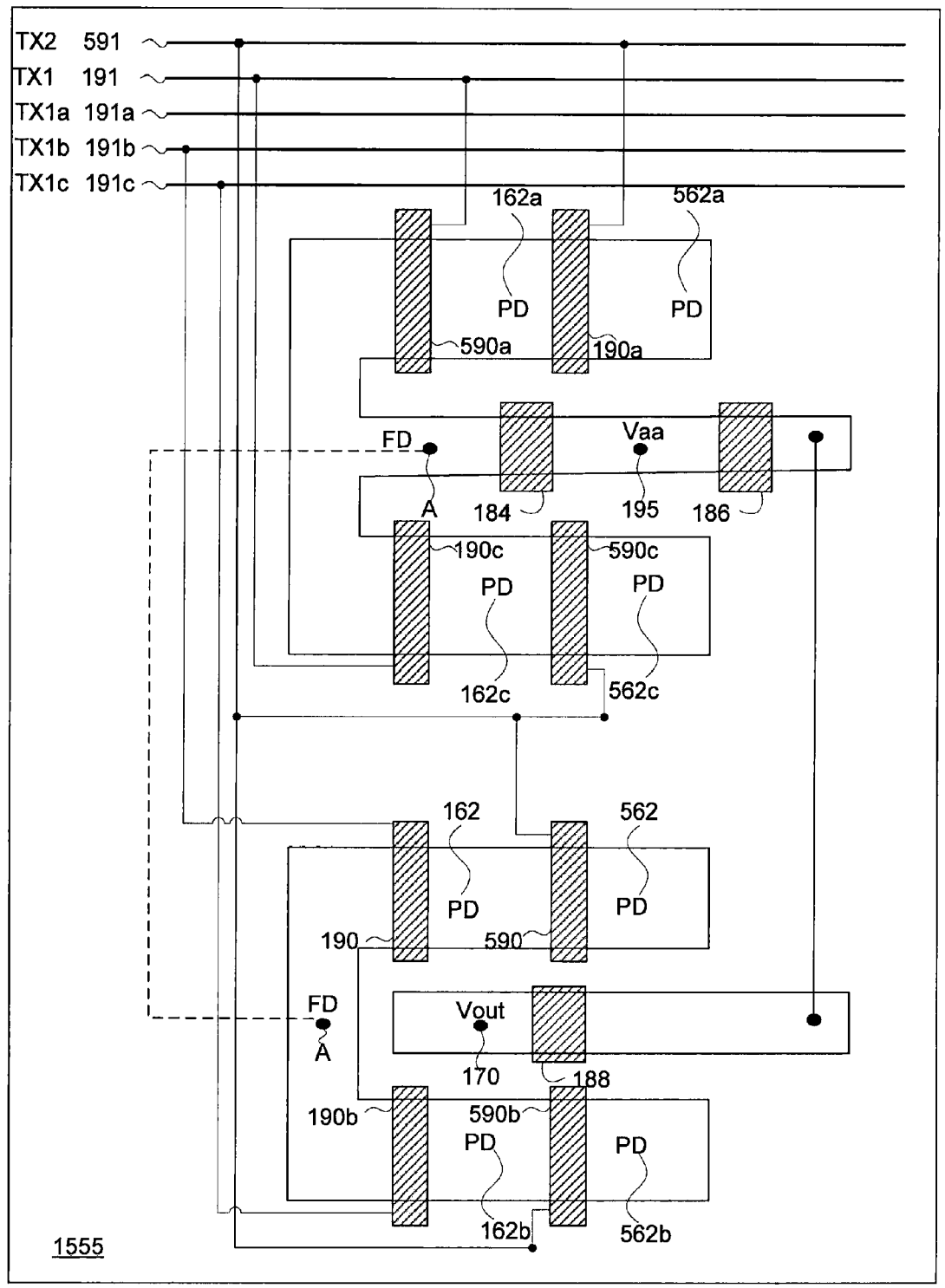
FIG. 15b is a top down view of an alternative implementation of the pixel of FIG. 13.

FIGS. 15a and 15b depict top down view of a four-way shared pixel circuit 1550 of FIG. 13. Four-way shared pixel architectures can be laid out/designed and operated in a "2×2," e.g., FIG. 15a, or "1×4", e.g., FIG. 15b, configuration as know in the art. The addition of a second PD in series with the primary PD, separated by a second TX, e.g., PD 562 in series with PD 162, separated by TX 590, still applies. With shared architectures, all the primary PD's (sharing a PD node) must be readout prior to pulsing the second TX and readout of the secondary PD's. As depicted in FIG. 15a, pixel circuit 1550 includes eight photodiodes 162, 162a, 162b, 162c, 562, 562a, 562b, 562c and associated transfer gates 190, 190a, 190b, 190c, 590, 590a, 590b, 590c having their gates coupled to transfer control lines 191, 191a, 191b, 191c, 591, 591, 591, 591 respectively. Pixel circuit 1550 also includes reset transistor gate 184, source follower transistor gate 186, row select transistor gate 188, voltage source V 195, column line output Vout 170, and floating diffusion nodes A.

As depicted in FIG. 15b, pixel circuit 1555 includes eight photodiodes 162, 162a, 162b, 162c, 562, 562a, 562b, 562c and associated transfer gates 190, 190a, 190b, 190c, 590, 590a, 590b, 590c having their gates coupled to transfer control lines 191, 191a, 191b, 191c, 591, 591, 591, 591 respectively. Pixel circuit 1555 also includes reset transistor gate 184, source follower transistor gate 186, row select transistor gate 188, voltage source V 195, column line output Vout 170, and floating diffusion nodes A.

The pixel array 530 that includes pixel circuits 1550 or pixel circuits 1555 provides several advantages: a first advantage is the doubling of photodiodes and associated spatial resolution by the inclusion of a single control line, i.e., transfer control line TX2 591, and four photodiodes, i.e., photodiodes 562, 562a, 562b, 562c and associated transfer gates, i.e., transfer gates 590, 590a, 590b, 590c. As noted above, in a conventional array, the inclusion of each additional photodiode requires an additional associated control line; thus, in a conventional pixel circuit, four transfer control lines would have been required to control the four additional transfer gates 590, 590a, 590b, 590c. Another advantage is that sharing density can be doubled without needing to increase the capacity of floating diffusion node A. Thus, conversion gain remains high. Furthermore, the additionally included photodiodes 562, 562a, 562b, 562c (respectively connected through the transfer gates 590, 590a, 590b, 590c) can be used for variations in the design and layout of a pixel array. For example, the additionally included photodiodes can be a different color than the photodiodes connected to the transfer gates 190, 190a, 190b and 190c, or they can be the same color to provide a spatial resolution within the same color. The various embodiments of the invention described herein may be incorporated in pixel array 230 and associated drivers and read out circuitry of the images shown in FIG. 2.

Figure 2:
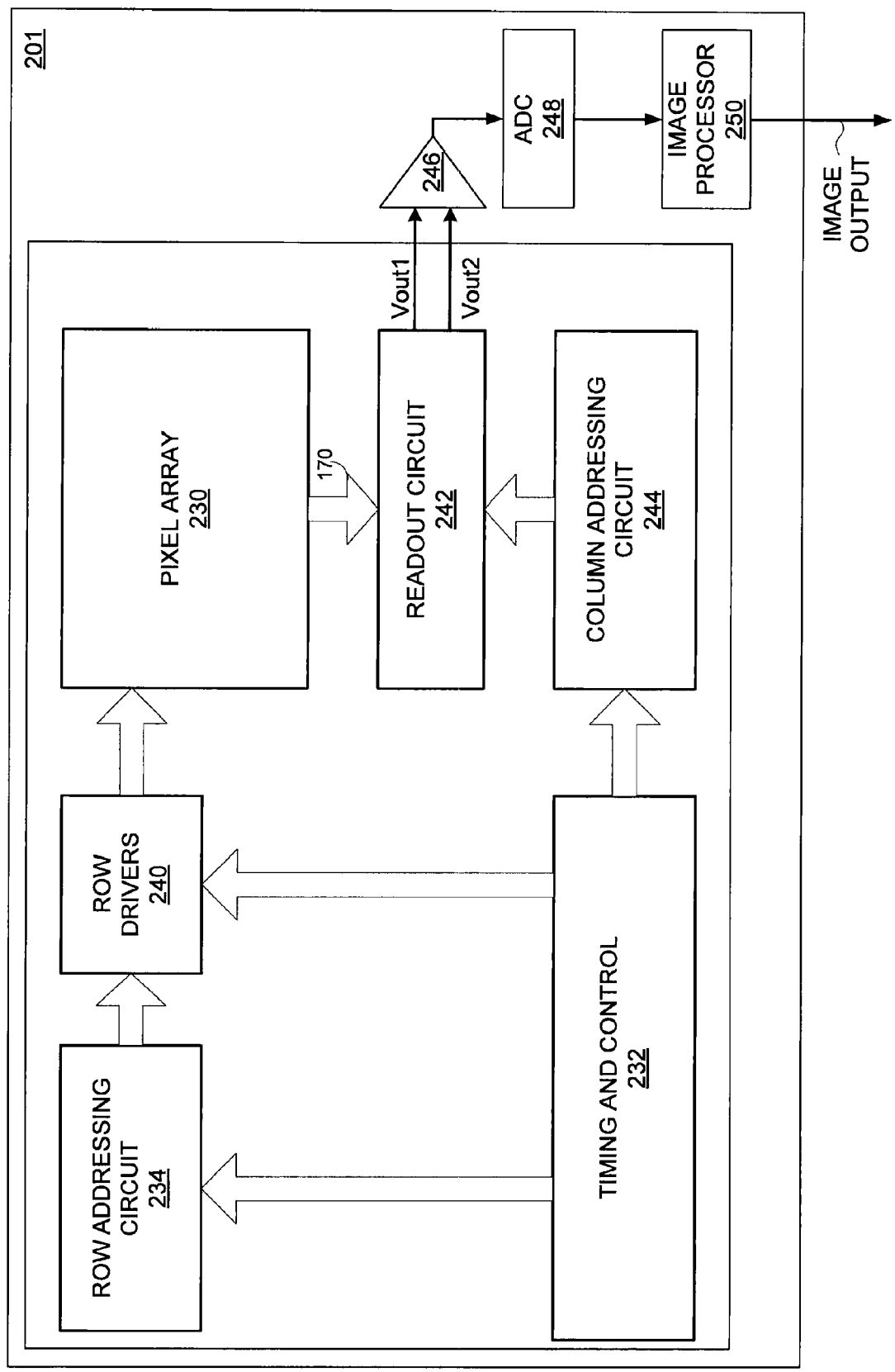
FIG. 2 is a block diagram of a conventional imager chip.
Figure 16:
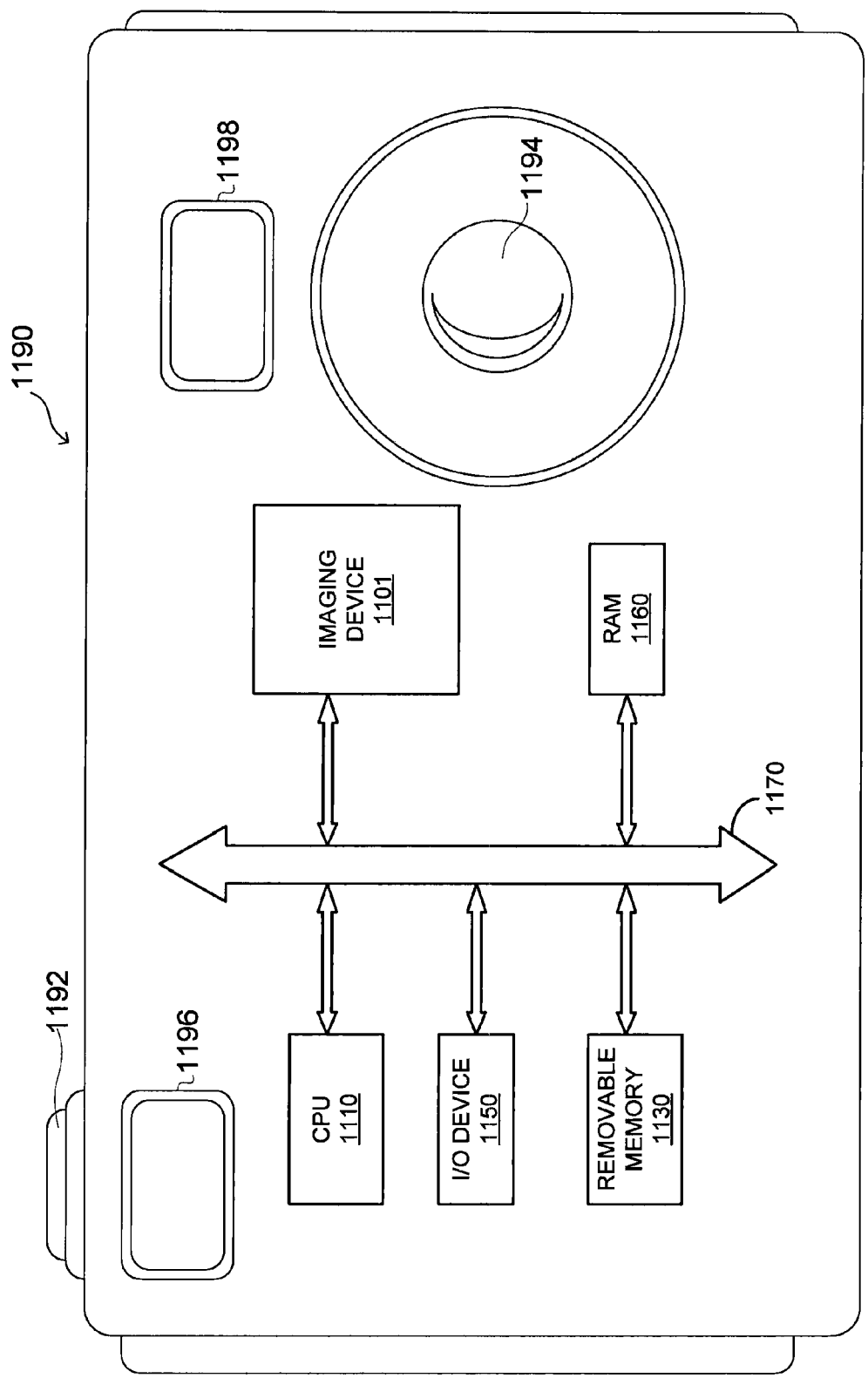
FIG. 16 is a block diagram representation of a processor-based camera system incorporating a CMOS imaging device in accordance with an embodiment of the invention.

FIG. 16 is a block diagram representation of processor system employing an imaging device 1101 which may include the invention imaging device 1101 may be constructed as shown in FIG. 2 but include a pixel array 230 and associated readout circuitry as described with respect to the various embodiments described herein. The processor system could, for example be a camera system 1190, incorporating an imaging device 1101 in accordance with an embodiment of the invention. A camera system 1190 generally comprises a shutter release button 1192, a view finder 1196, a flash 1198 and a lens system 1194 for focusing an image on the pixel array of imaging device 1101. A camera system 1190 generally also comprises a central processing unit (CPU) 1110, for example, a microprocessor for controlling camera functions which communicates with one or more input/output devices (I/O) 1150 over a bus 1170. The CPU 1110 also exchanges data with random access memory (RAM) 1160 over bus 1170, typically through a memory controller. The camera system may also include peripheral devices such as a removable memory 1130, which also communicates with CPU 1110 over the bus 1170. Imager device 1101 is coupled to the processor system and includes a pixel imaging circuit as described along with respect to FIGS. 6-15. Other processor systems which may employ imaging devices 1101 besides cameras, include computers, PDAs, cell phones, scanners, machine vision systems, and other systems requiring an imager operation.

While the invention has been described and illustrated with reference to specific example embodiments, it should be understood that many modifications and substitutions can be made. Although the embodiments discussed above describe specific numbers of transistors, photodiodes, conductive lines, etc., they are not so limited. Accordingly, the invention is not to be considered as limited by the foregoing description but is only limited by the scope of the claims.

What is claimed as new and desired to be protected by Letters Patent of the United States is:

1. A pixel array, comprising:
   a first control line;
   a second control line; and
   a plurality of pixel circuits arranged in a plurality of rows and a plurality of columns, each pixel circuit comprising:
      first and second transfer transistors, a gate of said first transfer transistor being coupled to said first control line and a gate of the second transistor being coupled to said second control line;
      first and second photodiodes; and
      a floating diffusion node, wherein said first photodiode is selectively coupled through second photodiode and said second transfer transistor to said floating diffusion node.

2. The pixel array of claim 1, wherein each pixel circuit further comprises:
   a reset transistor coupled between said floating diffusion node and a voltage source.

3. The pixel array of claim 1, wherein the first and second photodiodes have a same charge storage capacity.

4. The pixel array of claim 1, wherein the charge storage capacity of the first photodiode is less than the charge storage capacity of the second photodiode.

5. A pixel circuit, comprising:
   a plurality of first photodiodes;
   a plurality of second photodiodes;
   a plurality of first transfer transistors, each first transfer transistor being in between a respective one of said plurality of first photodiodes and a respective one of said plurality of second photodiodes, wherein a gate of said plurality of first transfer transistors are coupled to a first control line; and
   a plurality of second transfer transistors, wherein each first photodiode is selectively coupled to a floating diffusion node through a respective one of said plurality of second photodiodes and a respective one of said plurality of second transfer transistors.

6. The pixel circuit of claim 5, wherein the respective one of said plurality of second transfer transistors is coupled between said second photodiode and said floating diffusion node.

7. The pixel circuit of claim 6, further comprising
   a plurality of second control lines, a gate of each second transfer transistor being coupled to the second control line.

8. An imager comprising:
   a pixel array, comprising:
   a first control line;
   a second control line; and
   a plurality of pixel circuits arranged in a plurality of rows and a plurality of columns, each pixel circuit comprising:

first and second transfer transistors, a gate of said first transfer transistor being coupled to said first control line and a gate of the second transistor being coupled to the second control line;

first and second photodiodes; and a floating diffusion node, wherein said first photodiode is selectively coupled through said second photodiode and said second transfer transistor to said floating diffusion node.

9. The imager of claim 8, wherein each pixel circuit further comprises shared source follower and row select circuitry.

10. The imager of claim 8, wherein each pixel circuit comprises four photodiodes sharing the floating diffusion node.

11. The imager of claim 8, wherein each pixel circuit comprises eight photodiodes sharing the floating diffusion node.

12. The imager of claim 8, wherein said imager is part of a processing system, said imager coupled to a processor.

13. The imager of claim 8, wherein said imager is part of a camera system, said camera system having a lens for focusing on said imager.

14. A pixel array, comprising:

a common first control line;

at least one second control line; and a plurality of pixel circuits arranged in a plurality of rows and a plurality of columns, each pixel circuit comprising:

at least one first transfer transistor, a gate of each of said at least one first transfer transistor being coupled to said common first control line;

at least one second transfer transistor, a gate of each of said at least one second transfer transistor being coupled to a respective one of said at least one second control line;

at least one first photodiode;

at least one second photodiode; and a floating diffusion node, wherein each of said at least one first transfer transistor is coupled between a respective one of said at least one first photodiode and a respective one of said at least one second photodiode, and wherein each of said at least one second transfer transistor is coupled between the respective one of said at least one second photodiode and said floating diffusion node.

15. The pixel array of claim 14, wherein each pixel circuit further comprises:

a reset transistor coupled between said floating diffusion node and a voltage source.

16. The pixel array of claim 14, wherein the first and second photodiodes have a same charge storage capacity.

17. The pixel array of claim 14, wherein the charge storage capacity of the first photodiode is less than the charge storage capacity of the second photodiode.

18. An imager comprising:

a pixel array, comprising:

a single first control line;

a plurality of second control lines; and a plurality of pixel circuits arranged in a plurality of rows and a plurality of columns, each pixel circuit comprising:

a plurality of first transfer transistors, a gate of each of said plurality of first transfer transistors being coupled to said single first control line;

a plurality of second transfer transistors, a gate of each of said plurality of second transfer transistors being coupled to a respective one of said plurality of second control lines;

a plurality of first photodiodes;

a plurality of second photodiodes; and a floating diffusion node, wherein each of said plurality of first transfer transistors is coupled between a respective one of said plurality of first photodiodes and a respective one of said plurality of second photodiodes, and wherein each of said plurality of second transfer transistors is coupled between the respective one of said plurality of second photodiodes and said floating diffusion node.

19. The imager of claim 18, wherein each pixel circuit further comprises shared source follower and row select circuitry.

20. The imager of claim 18, wherein each pixel circuit comprises four photodiodes sharing the floating diffusion node.

21. The imager of claim 18, wherein each pixel circuit comprises eight photodiodes sharing the floating diffusion node.

* * * * *